United States Patent

Sugita et al.

Patent Number: 5,552,480
Date of Patent: Sep. 3, 1996

[54] THERMOPLASTIC RESIN COMPOSITION

[75] Inventors: Yasuhisa Sugita, Ichihara; Naoki Kitazawa; Hiroshi Hotta, both of Kyoto, all of Japan

[73] Assignees: Idemitsu Petrochemical Co., Ltd., Tokyo; Dai-ichi Kogyo Seiyaku Co., Ltd., Kyoto, both of Japan

[21] Appl. No.: 22,373

[22] Filed: Feb. 25, 1993

[30] Foreign Application Priority Data

Feb. 28, 1992 [JP] Japan .................... 4-042521
Feb. 28, 1992 [JP] Japan .................... 4-043987

[51] Int. Cl.$^6$ .............. C08L 69/00; C08L 67/02; C08L 25/04; C08L 23/04
[52] U.S. Cl. ............. 525/64; 525/66; 525/67; 525/68; 525/133; 525/148; 525/155; 525/166; 525/175; 525/176; 525/179; 525/182; 525/183
[58] Field of Search ............. 525/64, 66, 67, 525/68, 133, 148, 155, 166, 175, 176, 179, 182, 183

[56] References Cited

U.S. PATENT DOCUMENTS

| | | | |
|---|---|---|---|
| 4,204,047 | 5/1980 | Margotte | 525/148 |
| 4,657,970 | 4/1987 | Shiraki et al. | |
| 4,902,749 | 2/1990 | Akkapeddi | 525/64 |
| 5,130,378 | 7/1992 | Blum | 525/382 |

FOREIGN PATENT DOCUMENTS

| | | | |
|---|---|---|---|
| 0365118 | 4/1990 | European Pat. Off. | |
| 0382539 | 8/1990 | European Pat. Off. | |
| 412832 | 2/1991 | European Pat. Off. | 525/279 |
| 0438240 | 7/1991 | European Pat. Off. | |

*Primary Examiner*—David Buttner
*Attorney, Agent, or Firm*—Oblon, Spivak, McClelland, Maier & Neustadt, P.C.

[57] ABSTRACT

There is disclosed a thermoplastic resin composition comprising as principal components a [A] thermoplastic resin having a functional group reactive with an amino group, a [B] olefinic polymer and/or styrenic polymer, the subtotal of the above [A]+[B] being 100 parts by weight, and 0.05 to 20 parts by weight of a [C] copolymer having a unit represented by

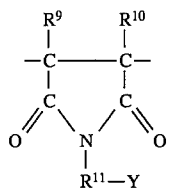

OR

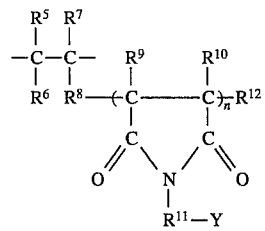

wherein Y is a group selected from the groups of the general formula

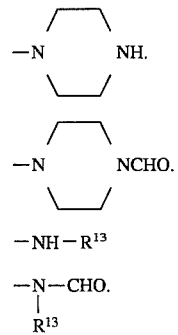

2 Claims, No Drawings

THERMOPLASTIC RESIN COMPOSITION

BACKGROUND OF THE INVENTION

1. Field of the Invention

The present invention relates to a thermoplastic resin composition. More particularly, it pertains to a thermoplastic resin composition which comprises at least two types of specific thermoplastic resins compounded with a novel copolymer having a formamide group and/or an amino group to enhance the compatibility among the aforesaid resins, which composition is excellent in all respects including surface impact strength, Izod impact strength and appearance.

2. Description of the Related Arts

Being generally excellent in both mechanical and thermal characteristics, an engineering plastics has recently been expanding to great proportions. Nevertheless, it is inferior to other general-purpose resins with respect to moldability, processability and production cost. In such circumstances, intensive research is concentrated on the settlement of the aforesaid problems and the development of concomitant characteristics by blending or alloying an engineering plastics with an olefinic resin or a styrenic resin each excellent in fluidity and advantageous in cost. A simple blending, however, leads to failure to compatibilize a plurality of different resins with each other, thereby causing such problems as remarkable deterioration of impact characteristics, liability to peeling or delamination and unfavorable appearance.

As the countermeasure against the above-mentioned problems, there has been carried out the development of compatilbilizers capable of improving the miscibility among the resins parallel to the improvement in the method of molding or processing. Examples of the technological method of improving miscibility include modification of resins, addition of a copolymer thereto, reaction with a reactive resin or a reactive reagent in an extruder and the combination of at least two of them.

Specifically, the modification of a constituent resin for polycarbonate is disclosed in Japanese Patent Application Laid-Open Nos. 157648/1980, 123251/1982, 201842/1983, 223742/1984 and 223749/1984. There is also proposed an intricate method of improvement with the combination of several means as disclosed in Japanese Patent Application Laid-Open Nos. 215714/1988, 215749 to 215753/1988 and 75543 to 75550/1989. In addition, there are disclosed the modification of polyamide or polyester with a modified polyolefin in Japanese Patent Application Publication No. 30954/1970 and a method of improving a resin composition comprising a styrenic copolymer containing maleic anhydride and a polyamide by means of glass fiber in Japanese Patent Application Laid-Open No. 62844/1981. Furthermore, an attempt is made to improve the delamination and Izod impact strength of the blend of polycarbonate, polyamide, polyester or polyether with a polyolefin by incorporating therein a polymer having an amino group and when necessary, a polyurethane in addition thereto in Japanese Patent Application Laid-Open No. 36248/1990.

The above-mentioned modification is intended to provide a new characteristic material by ingeniously combining the advantage of each of the components. However, in any of the aforesaid methods, the miscibility with each other is still insufficient, the above-described problems with regard to blending still remain unsolved and improvement can not be said to be sufficient on appearance and peeling on the surface of a resin product, especially on impact characteristics. For example, even if a resin as modified in the aforestated manner has a high Izod impact strength in impact characteristics evaluation which is usually made by means of Izod impact test, it is sometimes deteriorated in surface impact characteristics that is valuable in practice. In view of the above, the resin is required to be excellent in both Izod impact strength and surface impact characteristics in order that the resin may render itself really excellent in impact characteristics.

In the light of the above-described background, intensive research and investigation were made by the present inventors on the improvement of engineering plastics. As a result, it has been found by them that a thermoplastic resin composition excellent in impact characteristics, especially surface impact characteristics as well as appearance, minimized in coloration and free from delamination or peeling is obtained by melt kneading a thermoplastic resin such as engineering plastics and an olefinic polymer and/or a styrenic polymer with a novel copolymer having a formamide group and/or an amino group. The present invention has been accomplished on the basis of the above mentioned finding and information.

SUMMARY OF THE INVENTION

It is an object of the present invention to provide a thermoplastic resin composition excellent in impact characteristics, especially surface impact characteristics as well as appearance, minimized in coloration and free from delamination or peeling.

Specifically, the present invention provides a thermoplastic resin composition which comprises as principal components 5 to 95% by weight of a [A] thermoplastic resin having a functional group reactive with an amine group, 95 to 5% by weight of [B] at least one polymer selected from an olefinic polymer and a styrenic polymer, the subtotal of the above [A]+[B] being 100 parts by weight and 0.05 to 20 parts by weight of a [C] copolymer or a salt thereof, said copolymer having in a molecule thereof at least one group selected from a formamide group and an amine group, said copolymer having 20 to 99.8 mol % of the repeating unit I represented by the general formula (I); 50 to 0 mol % of the repeating unit II represented by the general formula (II); and 60 to 0.2 mol % of the repeating unit III represented by the general formula (III) or the repeating unit IV represented by the general formula (IV)

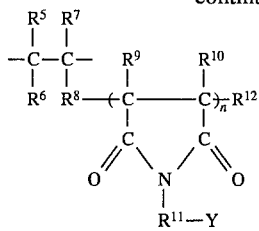

(IV)

wherein $R^1$, $R^2$, $R^5$, $R^6$ and $R^7$, independently of one another, are each a hydrogen atom, an alkyl group having 1 to 10 carbon atoms, a cycloalkyl group having 3 to 8 carbon atoms, an aryl group having 6 to 10 carbon atoms, an alkenyl group having 2 to 4 carbon atoms, an alkoxy group having 1 to 4 carbon atoms, an alkoxycarbonyl group having 1 to 18 carbon atoms, an alkylcarboxyl group having 1 to 17 carbon atoms, an alkylcarbonyl group having 1 to 6 carbon atoms, an arylcarbonyl group having 6 to 8 carbon atoms, a halogen atom or a nitrile group; $R^3$ and $R^4$, independently of one another, are each a hydrogen atom, an alkyl group having 1 to 4 carbon atoms, an alkenyl group having 2 to 4 carbon atoms or a halogen atom; $R^8$ is absent or denotes a methylene group or an ethylene group; $R^9$ and $R^{10}$, independently of one another, are each a hydrogen atom, an alkyl group having 1 to 6 carbon atoms or an aryl group having 6 to 8 carbon atoms; $R^{11}$ is an alkylene group having 1 to 12 carbon atoms, a cycloalkylene group having 5 to 17 carbon atoms, an arylene group having 6 to 12 carbon atoms, an arylalkylene group having 7 to 12 carbon atoms or a polyoxyalkylene group having 4 to 30 carbon atoms; $R^{12}$ is a hydrogen group or an alkyl group having 1 to 10 carbon atoms; Y is at least one kind of amino group selected from the group consisting of the general formulae (V) to (VIII).

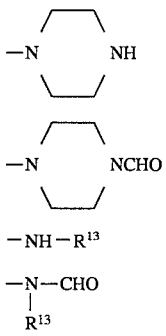

$-NH-R^{13}$ (VII)

$-N-CHO$ (VIII)
$\phantom{-N-}|$
$\phantom{-N-}R^{13}$ where $R^{13}$ in the general formula (VII) and (VIII) is an alkyl group having 1 to 6 carbon atoms; $R^1$ to $R^{13}$ may be the same or different in each of the repeating unit; and n is an integer from 1 to 10.

DESCRIPTION OF THE PREFERRED EMBODIMENTS

As described hereinbefore, the composition according to the present invention comprises the components [A], [B] and [C]. The component [A] may only have a functional group which is reactive with an amino group. It is thought that the formamide group incorporated in the component [C] causes carbon monoxide removing reaction to take place due to the heat at the time of melt kneading, and thereby a copolymer having the formamide group turns into a copolymer having an amino group having high reactivity. Accordingly, since the functional group of the component [C] functions substantially as a secondary amine with high reactivity, the thermoplastic resin having a functional group reactive with an amino group is usable as the component (A) in the composition of the present invention.

Specific examples of the functional group reactive with an amino group include the group from a carboxylic acid, other organic acid, an ester and a sail thereof, an acid anhydride and a salt thereof, hydroxyl group, a thiol, oxazoline, an epoxy group, an isocyanate group, an amide bond, a carbonate bond, a urethane bond, a urea bond and an ether bond. The preferably usable thermoplastic resin as the component [A] is that having at least one bond selected from carbonate bond, ester bond, amide bond and ether bond.

The thermoplastic resin having a carbonate bond to be used as the above-mentioned component (A) is typified by polycarbonate resin, which may be aliphatic or aromatic. The molecular weight of the resin is not specifically limited but is usually 10,000 to 100,000, preferably 10,000 to 40,000 in terms of viscosity-average molecular weight taking into consideration the moldability and physical properties of the resin composition to be produced. The polycarbonate resin is acceptable only if the terminal group thereof is the ordinary monohydric phenolic terminal [including phenol, a halogen-substituted phenol (cumylphenol, octylphenol) and other substituted phenol]. There is also permissible the polycarbonate resin into which the functional group or bond reactive with the above-mentioned amino group is introduced at the terminal of a molecule or in the form of graft, block or random copolymerization. The resin may also be incorporated with any of a variety of additives, an elastomer or a filler for the purpose of modification or reinforcement at the time of or after the polymerization.

The polycarbonate resin as described above can be produced by any of publicly known processes, which include phosgene process, transesterification process, melt polymerization process, etc.

Various polycarbonate resins are available and exemplified by the polymer having repeating units represented by the general formula (IX)

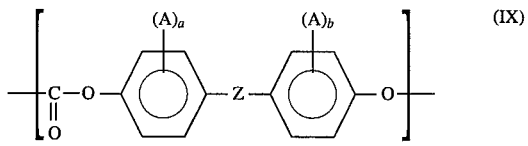

wherein Z is merely a bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, $SO_2$, SO, O, CO or the group represented by the formula;

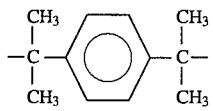

A is a hydrogen atom, a chlorine atom, a bromine atom or a saturated alkyl group having 1 to 8 carbon atoms; and a and b, independently of one another, are each a number from 0 to 4.

The aforementioned polycarbonate resin can be produced by, for example, a solvent process in which a dihydric phenol is reacted with a carbonate precursor such as phosgene or a dihydric phenol is transesterified with a carbonate precursor such as diphenyl carbonate each in a solvent such as methylene chloride in the presence of a known acid acceptor and a molecular-weight modifier.

Examples of the favorably usable dihydric phenols include bisphenols, of which is particularly desirable 2,2-bis(4-hydroxyphenyl)propane [usually termed bisphenol A]; a bisphenol A replaced in part or in whole with the other dihydric phenol; dihydric phenols exemplified by hydroquinone; 4,4'-dihydroxydiphenyl; bis(4-hydroxyphenyl)alkane; bis(4-hydroxyphenyl)cycloalkane; bis(4-hydroxyphenyl)sulfide; bis(4-hydroxyphenyl)sulfone; bis(4-hydroxyphenyl)sulfoxide; bis(4-hydroxyphenyl)ether; and halogenated bisphenol such as bis(3,5-dibromo-4-hydroxyphenyl)propane; and bis(3,5-dichloro-4-hydroxyphenyl)propane. The dihydric phenol may be a homopolymer of a dihydric phenol, a copolymer of at least two thereof or a blend of at least two thereof. In addition the polycarbonate resin may be a thermoplastic randomly branched polycarbonate obtained through the reaction among a multifunctional aromatic compound and a dihydric phenol and/or a carbonate precursor. The thermoplastic resin having a carbonate bond other o than the above-mentioned polycarbonate is exemplified by polyester polycarbonate resin, which is favorably used.

The resin to be used as the aforesaid component [A] is exemplified by a thermoplastic resin having an ester bond, namely polyester resin in addition to the resin having a carbonate bond. A wide diversity of polyester resins may be employed without specific limitation to the types thereof. They may be either aliphatic or aromatic, but aromatic polyesters are preferable in view of the physical properties. The molecular weight thereof may be suitably selected in accordance with the purpose of use and the like, and is usually 0.2 to 2.0 dl/g, preferably 0.5 to 1.2 dl/g expressed in terms of intrinsic viscosity. The terminal of the polyester resin may be constituted of a carboxylic acid terminal or an alcoholic hydroxy group terminal. The constitutional ratio between the above terminals is not specifically limited but is preferably 9/1 to 1/9. There is also usable the polyester resin into which the functional group or bond reactive with the aforementioned amino group is introduced at the terminal of a molecule or in the form of graft, block or random copolymerization. The resin may also be incorporated with an elastomer, a filler or any of a variety of additives at the time of or after the polymerization for the purpose of modification or reinforcement or with two or more types of dicarboxylic acid component to the extent that the physical properties of the composition is not impaired.

Such polyester resin can be produced by any of known processes and exemplified by a wide diversity of kinds.

Specific examples of the polyester resin usable in the present invention include polyethylene terephthalate (PET), polybutylene terephthalate (PBT), polycyclohexadimethylene terephthalate (PCT) and polyarylate, among which are particularly desirable polyethylene terephthalate (PET) and polybutylene terephthalate (PBT). The PET may be the polyester which comprises an aromatic dicarboxylic acid component comprising terephthalic acid as the primary component and a glycol component comprising ethylene glycol component as the primary component, or the polyester produced by copolymerizing other dicarboxylic acid component and a glycolic component.

Further examples of the resin to be employed as the aforestated component [A] include the thermoplastic resin having an amide bond, namely a polyamide resin. Various polyamide resins may be employed without specific limitation to the types thereof. They may be either aliphatic or aromatic. The molecular weight thereof is not specifically limited but is usually 4,000 to 50,000, preferably 5,000 to 30,000 in terms of number-average molecular weight taking into consideration the moldability and physical properties of the resin composition to be produced. There is also usable the polyamide resin into which the functional group or bond reactive with the aforestated amino group is introduced at the terminal of a molecule or in the form of graft, block or random copolymerization. The resin may also be incorporated with an elastomer, a filler or any of a variety of additives at the time of or after the polymerization for the purpose of modification or reinforcement.

Such polyamide resin can be produced by any of known processes, for example, by ring-opening (co)polymerization, (co)polymerization or (co)polycondensation of a lactam of three or more-membered ring, a polymerizable co-amino acid or a dibasic acid with a piperazine derivative or a diamine, more specifically, by (co)polymerization of ε-caprolactam, amino caproic acid, 11-amino undecanoic acid or the like, or (co)polymerization or (co)polycondensation of a piperazine derivative such as a hexamethylenepiperazine derivative, hexamethylenediamine, a nonamethylenepiperazine derivative, nonamethylenediamine, a undecamethylenepiperazine derivative, undecamethylenediamine, a dodecamethylenepiperazine derivative, dodecamethylenediamine, a metaxylylenepiperazine derivative and metaxylylenediamine or a diamine with a dicarboxylic acid such as terephthalic acid, isophthalic acid, adipic acid, sebacic acid, dibasic dodecanoic acid and glutaric acid.

A variety of polyamide resins are available and specifically enumerated by aliphatic polyamide such as nylon 6 (polyamide 6); nylon 6,6; nylon 6,10; nylon 11; nylon 12; nylon 6, 12; and nylon 4,6; aliphatic copolymerized polyamide such as nylon 6/6,6; nylon 6/6,10; and nylon 6/6,12, and aromatic polyamide such as polyhexamethylenepiperazine derivative terephthalamide; polyhexamethylenediamine terephthalamide; polyhexamethylenepiperazine derivative isophthalamide; polyhexamethylenediamine isophthalamide and xylylene group-containing polyamide [for example, nylon-MXD (metaxylylenepiperazine derivative and metaxylylenediamine)], and in addition, polyester amide, polyether amide and polyesterether amide. Among those are particularly desirable nylon 6 and nylon 6,6.

Still further examples of the resin to be employed as the above-mentioned component [A] include the thermoplastic resin having an ether bond, namely a polyether resin. Various polyether resins may be employed without specific limitation to the types thereof whether they are aliphatic or aromatic. There is also usable the polyether resin into which the functional group or bond reactive with the aforestated amino group is introduced at terminal of a molecule or in the form of graft, block or random copolymerization.

Examples of such polyether resins can be roughly classified into polyacetal homopolymer such as polyoxymethylene (POM); polyacetal copolymer having mixed polyether unit moieties such as trioxane/ethylene oxide copolymer; polyphenylene ether (PPE); polyether sulfone having mixed ether groups and sulfone groups (PES); polyether ketone having mixed ether groups and carbonyl groups (PEK); polyphenylene sulfide having a thioether group (PPS); and polysulfone (PSO), among which are preferable polyacetal (polyoxymethylene (POM)) and polyphenylene ether (PPE).

The polyacetal homopolymer is a polymer having oxymethylene unit as the main chain in a molecule and can be produced by homopolymerization of formaldehyde or trioxane. On the other hand, the polyacetal copolymer is a copolymer in which oxyalkylene unit such as oxyethylene unit, oxypropylene unit and oxytetramethylene unit; oxyphenylethylene unit; or the like is randomly mixed in the chain consisting of the aforementioned oxymethylene unit.

The polyacetal copolymer can be produced by copolymerization of formaldehyde or trioxane with a cyclic ether such as ethylene oxide.

In the thermoplastic resin composition according to the present invention, one or two or more kinds of the above-described resins are employed alone or as the mixture as the component [A] along with an olefinic polymer, a styrenic polymer or a mixture thereof as the component [B]. Various olefinic polymers may be employed without specific limitation provided that the polymer has a polyolefinic component. Specific examples of the polyolefinic resin include polyethylene (linear low density polyethylene (LLDPE), low density polyethylene (LDPE), ultralow density polyethylene (ULDPE), high density polyethylene (HDPE)), polypropylene, polybutene, polyisobutene, ethylene/α-olefin copolymer such as ethylene/propylene copolymer, ethylene/propylene copolymer rubber (EPR), ethylene/butene copolymer (EBM), ethylene/propylene/diene copolymer (EPDM), ethylene/propylene/butene copolymer and ethylene/butylene copolymer, propylene/other α-olefin copolymer such as propylene/butene copolymer, ethylenic copolymer (ethylene/vinyl acetate copolymer (EVA), ethylene/vinyl alcohol copolymer (EVOH), ethylene/maleic anhydride copolymer, ethylene/alkyl (meth)acrylate copolymer, etc.) poly(4-methyl-1pentene) and a mixture thereof. The term "copolymer" as used herein include random, block, random block and graft copolymer.

The molecular weight of the above-mentioned olefinic polymer may be suitably selected in accordance with various conditions and is usually 5,000 to 1,000,000, preferably 10,000 to 700,000 in terms of number-average molecular weight.

On the other hand, various styrenic polymers may be employed without specific limitation also as the component [B] provided that the polymer has a styrenic component such as styrene, α-methylstyrene and p-methylstyrene. Examples of the styrenic polymers include general-purpose polystyrene (GPPS), high-impact polystyrene (HIPS), syndiotactic polystyrene (SPS), styrene/maleic acid copolymer (SMA), styrene/maleic acid/maleimide copolymer, styrene/maleimide copolymer, GPSMA, rubber reinforced SMA, MS resin, AS resin, ABS resin including highly heat resistant ABS resin. AAS resin and AES resin and further, so-called styrenic thermoplastic elastomer including SEBS resin, SEPS resin, SEP resin and derivative thereof.

The molecular weight of the aforestated styrenic polymer may be suitably selected in accordance with various conditions and is usually 20,000 to 600,000, preferably 30,000 to 500,000 in terms of number-average molecular weight.

The ratio in % by weight of the component [A] to the component [B] in the composition of the present invention is [A]: [B]=5 to 95:95 to 5, preferably 30 to 95:70 to 5. In the case where the above ratio deviates from the range, an excessively high amount of the component [A] results in the deterioration of moldability, whereas an excessively high amount of the component [B] lead to the disadvantage of insufficient mechanical-strength such as rigidity.

The composition according to the present invention comprises a copolymer having formamide group and/or amino group as the component [C] in addition to the components [A] and [B], which is a new random, block or graft copolymer of the repeating unit I represented by the general formula (I), the repeating unit II represented by the general formula (II) and the repeating unit III represented by the general formula (III) or the repeating unit IV represented by the general formula (IV). As to the proportion of each of the repeating units based on the total amount of the repeating units I, II and III or I, II and IV, the proportion of the repeating unit I is 20.0 to 99.8 mol %, preferably 45.0 to 99.5 mol %, the proportion of the repeating unit II is 50.0 to 0.0 mol %, preferably 40.0 to 0.0 mol % and the proportion of the repeating unit III is 60 to 0.2 mol %, preferably 50 to 0.2 mol % or the proportion of the repeating unit IV is 60 to 0.2 mol %, preferably 20 to 0.2 mol %. The proportion of the repeating unit III or IV less than 0.2 mol % results in failure to manifest the effect of addition thereof, while that exceeding 60 mol % leads to worsened dispersion of the component [C], resulting in deterioration of the physical properties especially the surface impact strength of the composition to be produced. The symbol Y in the general formula (III) or (IV) of the repeating unit III or IV is the amino group as represented by the general formulae (V) to (VIII) and may be the same or different in each repeating unit. Accordingly, the repeating unit having CHO (aldehyde group) coexists with the repeating unit not having CHO as the case may be.

The copolymer having formamide group and/or amino group is constituted basically of the aforesaid repeating units I, II and III or I, II and IV, but may have other repeating unit in some quantity in addition thereto.

Specifically, the copolymer that is constituted basically of the repeating units I. II and III may have, to some extent, the repeating unit represented by the general formula (X).

wherein $R^9$ to $R^{11}$ and Y are each as previously defined. Likewise, the copolymer that is constituted basically of the repeating units I, II and IV may have to some extent, the repeating unit represented by the general formula (XI)

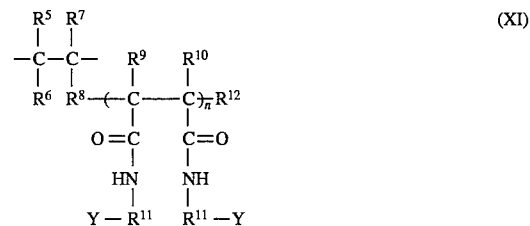

wherein $R^5$ to $R^{12}$, Y and n are each as previously defined.

The molecular weight of the copolymer having formamide group and/or amino group is not specifically limited but is usually 3,000 to 500,000 expressed in terms of viscosity-average molecular weight, which corresponds to the viscosity in the range of 10 to 50,000 cPs of the 10% by weight of solution of the aforementioned copolymer in a proper solvent such as toluene, xylene, cumene, tetralin, 1,3-dimethyl-2-imidazolidinone, dimethyl sulfoxide, acetone, methyl ethyl ketone or the like.

The copolymer as the component [C] is characterized by its having formamide group and/or amino group in the side chain of the repeating unit III or IV via imide group. Examples of the copolymer also include the copolymer having a salt formed by the combination of the aforesaid amino group with an acid exemplified by sulfuric acid; sulfonic acid such as benzenesulfonic acid, toluenesulfonic acid and naphthalenesulfonic acid: halogeno-acid such as hydrochloric acid, hydrofluoric acid, hydrobromic acid and hydroiodic acid; nitric acid; boric acid; and phosphoric acid.

In the general formula (I) which represents the repeating unit I, $R^1$ and $R^2$, independently of one another, that is, they may be the same or different in each repeating unit, are each a hydrogen atom, an alkyl group having I to 10, preferably I to 4 carbon atoms, a cycloalkyl group having 3 to 8, preferably 3 to 6 carbon atoms, an aryl group having 6 to 10, preferably 6 to 9 carbon atoms, an alkoxy group having 1 to 4 carbon atoms, an alkoxycarbonyl group having 1 to 18, preferably 1 to 8 carbon atoms, an alkylcarboxyl group having 1 to 17, preferably 1 to 3 carbon atoms, an alkylcarbonyl group having 1 to 6, preferably 1 to 4 carbon atoms, an arylcarbonyl group having 6 to 8 carbon atoms, a halogen atom, preferably a chlorine or bromine atom, or a nitrile group. The general formula (I) includes the case where one repeating unit I is an ethylene unit ($R^1$ and $R^2$ are simultaneously hydrogen atoms) and the another is a propylene unit ($R^1$ is a hydrogen atom and $R^2$ is a methyl group).

In the general formula (II) which represents the repeating unit II, $R^3$ and $R^4$, independently of one another, that is, they may be the same or different in each repeating unit as is case with the aforestated $R^1$ and $R^2$, are each a hydrogen atom, an alkyl group having 1 to 4 carbon atoms such as a methyl group or an ethyl group, an alkenyl group having 2 to 4 carbon atoms such as vinyl group or allyl group or a halogen atom such as a chlorine atom or a bromine atom.

In the general formulae (III) and (IV) which represent the repeating units III and IV, respectively, $R^5$ to $R^7$ are each the same as any of the aforestated $R^1$ and $R^2$; $R^8$ is absent, that is, means a bond only or denotes a methylene group or an ethylene group; $R^9$ and $R^{10}$, independently of one another, are each a hydrogen atom, an alkyl group having 1 to 6, preferably 1 to 2 carbon atoms or an aryl group having 6 to 8 carbon atoms; $R^{11}$ is an alkylene group having 1 to 12, preferably 1 to 8 carbon atoms such as a group of methylene, ethylene, tetramethylene or hexamethylene, a cycloalkylene group having 5 to 17, preferably 6 to 10 carbon atoms such as a cyclohexylene group or a methylenecyclohexylmethylene group, an arylene group having 6 to 12 carbon atoms, preferably a phenylene group or an oxydiphenylene group, an arylalkylene group having 7 to 12, preferably 8 to 10 carbon atoms such as a xylylene group or a polyoxyalkylene group having 4 to 30, preferably 4 to 15 carbon atoms such as polyoxymethylene a polyoxypropylene; $R^{12}$ is a hydrogen atom or an alkyl group having 1 to 10, preferably 1 to 8 carbon atoms; Y is an amino group represented by the general formula (V), (VI), (VII) or (VIII).

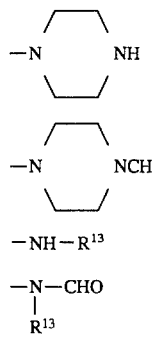

wherein $R^{13}$ is an alkyl group having 1 to 6 carbon atoms.

In the above-mentioned formulae, $R^5$ to $R^{13}$ and Y may be each the same or different in each repeating unit as is the case with the aforestated $R^1$ and $R^2$; n is an integer from 1 to 10, preferably 1 to 3; when n is plural, that is, 2 or more, $R^9$, $R^{10}$, $R^{11}$, $R^{13}$ and Y each being present in the number same as that of n may be each the same or different; when the amino group Y is a secondary amino group as represented by the general formula (V) or (VII), Y may be in the form of a salt which is combined with an acid exemplified by include sulfuric acid, sulfonic acid such as benzenesulfonic acid, toluenesulfonic acid and naphthalenesulfonic acid, halogeno-acid such as hydrochloric acid, hydrofluoric acid, hydrobromic acid and hydroiodic acid, nitric acid, boric acid and phosphoric acid.

Various processes are available for the production of the copolymer as the component [C] to be used in the present invention without specific limitation, among which any of the following processes (a), (b) and (c) is capable of more efficiently producing the copolymer.

The process (a) is exemplified by the process in which the copolymer which comprises in a molecule thereof 20 to 99.8 mol % of the repeating unit I, 50 to 0 mol % of the repeating unit II and 60 to 0.2 mol % of the repeating unit represented by the general formula (XII) (starting copolymer a)

wherein $R^9$ and $R^{10}$ are each as previously defined or the copolymer which comprises in a molecule thereof 20 to 99.8 mol % of the repeating unit I, 50 to 0 mol % of the repeating unit II and 60 to 0.2 mol % of the repeating unit represented by the general formula (XIII) (starting copolymer b)

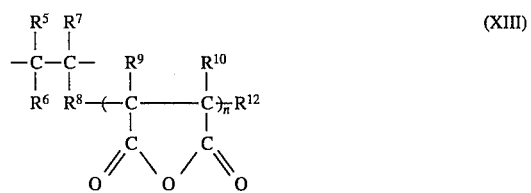

wherein $R^5$ to $R^{10}$, $R^{12}$ and n are each as previously defined each is reacted with a salt of a piperazine derivative represented by the general formula (XIV)

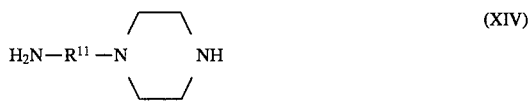

wherein $R^{11}$ is as previously defined or a salt of the diamine represented by the general formula (XV)

wherein $R^{11}$ and $R^{13}$ are each as previously defined in the presence of a formyl group-containing compound and thereafter the reaction product is brought into contact with a base for the removal of the residual acid.

The process (b) is exemplified by the process in which the starting copolymer a orb is reacted with the reaction product that is produced in advance by reacting the piperazine derivative represented by the general formula (XIV) or the diamine represented by the general formula (XV) with a formyl group-containing compound.

The process (c) is exemplified by the process in which the starting copolymer a or b is reacted with a salt of the piperazine derivative represented by the general formula (XIV) or a salt of the diamine represented by the general formula (XV) in the absence of a formyl group-containing compound and thereafter the reaction product is brought into contact with a base for the moval of the residual acid.

According to the process (a), process (b) and process (c) there are obtained, respectively a copolymer having a formamide group mixed with a secondary amino group, a copolymer having a formamide group without secondary amino group and a copolymer having a secondary amino group without formamide group.

As the copolymer as the component [C] in addition to that produced by the process (a), (b) or (c), there is usable the unsaturated copolymer obtained through the known process as described, for example, in Japanese Patent Application Laid-Open No. 93817/1991, though the effect of the present invention tends to be somewhat lowered by the use thereof.

The starting copolymer a having the repeating units I, II and XII for the production of the copolymer as the copolymer [C] is produced by subjecting the monomers giving the repeating units represented by the general formulae (I), (II) and (XII), respectively to radical polymerization or ionic polymerization by a known method.

The starting copolymer b having the repeating units I, II and XIII for the production of the copolymer as the copolymer [C] is produced by subjecting the monomers giving the repeating units represented by the general formulae (I) and (II), respectively to radical polymerization or ionic polymerization by a known method and subsequently grafting the monomer giving the repeating unit represented by the general formula (XIII) onto the resulting polymer by a known method.

A variety of monomers giving the repeating unit I represented by the general formula (I) are available and specifically exemplified by olefin such as ethylene, propylene, 1-butene, 1-octene and isobutylene; cyclic olefin such as cyclopentene, cyclohexene and cyclooctene; styrenic monomer (aromatic vinyl compound) such as styrene, α-methylstyrene, vinyltoluene and p-tert-butylstyrene; vinyl ester such as vinyl acetate, vinyl butyrate and vinyl stearate; vinyl ether such as methylvinyl ether and ethylvinyl ether; halogeno-olefin such as vinyl chloride and vinylidene chloride; (meth)acrylate such as methyl (meth)acrylate, ethyl (meth)acrylate, butyl (meth)acrylate, hexyl (meth)acrylate, cyclohexyl (meth)acrylate, decyl (meth)acrylate, octadecyl (meth)acrylate and methoxyethyl (meth)acrylate; nitrile such as acrylonitrile and methacrylonitrile and vinyl ketone such as methylvinyl ketone and phenylvinyl ketone. Each of them may be used alone or in combination with at least one of others.

Among them are preferable ethylene, propylene, styrene, methylvinyl ether, isobutylene, vinyl acetate and (meth)acrylate.

Specific examples of monomers giving the repeating unit II represented by the general formula (II) include conjugated diene such as butadiene, isoprene and chloroprene. Each of them may be used alone or in combination with at least one of others. Among them are preferable butadiene and isoprene.

Specific examples of monomers giving the repeating unit XII represented by the general formula (XII) include unsaturated dicarboxylic anhydride; such as maleic anhydride, methylmaleic anhydride, 1,2-dimethylmaleic anhydride, ethylmaleic anhydride, phenylmaleic anhydride and itaconic anhydride.

The repeating unit XIII represented by the general formula (XIII) can be formed by copolymerizing the monomer giving the repeating unit I with the monomer giving the repeating unit II through a known method and grafting onto the resultant copolymer, an unsaturated dicarboxylic anhydride such as maleic anhydride, methylmaleic anhydride, 1,2-dimethylmaleic acid, ethyl maleic anhydride, phenylmaleic anhydride and itaconic anhydride by the use of a known peroxide or a polymerization initiator. The preferable grafting monomer is maleic anhydride. The graft reaction proceeds by the bonding of a grafting monomer such as maleic anhydride with the repeating unit I or II. As the starting polymer having the repeating unit XIII to be used in the present invention, there may be employed the polymer available in the market as the polymer in which the unsaturated dicarboxylic anhydride is grafted such as maleic acid-modified EPR and maleic acid-modified SEBS. The starting copolymers a and b that are starting materials for producing the copolymer as the component [C] may have, as necessary, the repeating unit having carbon-carbon double bond originating from conjugated diene such as butadiene, isoprene and chloroprene along with the repeating units I, II and XII or XIII.

The starting copolymer a for the component [C] is exemplified by but shall not be limited to styrene/maleic anhydride copolymer, ethylene/maleic anhydride copolymer, propylene/maleic anhydride copolymer, ethylene/propylene/maleic anhydride copolymer, isobutylene/maleic anhydride copolymer, methyl vinylether/maleic anhydride copolymer, styrene/isoprene/maleic anhydride copolymer, ethylene/maleic anhydride/ethyl acrylate copolymer, ethylene/maleic anhydride/methyl acrylate copolymer, ethylene/vinyl acetate/maleic anhydride copolymer and styrene/butadiene/maleic anhydride copolymer.

The starting copolymer b for the component [C] is exemplified by but shall not be limited to the copolymer obtained by grafting an unsaturated dicarboxylic anhydride such as maleic anhydride. methylmaleic anhydride, 1,2-dimethylmaleic acid, ethylmaleic anhydride, phenylmaleic anhydride and itaconic anhydride onto polyethylene, polypropylene, polyisoprene and hydrogenated product thereof, polybutadiene and hydrogenated product thereof, chloroprene rubber and hydrogenated product thereof, nitrile rubber and hydrogenated product thereof, ethylene/propylene copolymer, ethylene/(meth)acrylate copolymer, styrene/isoprene copolymer and hydrogenated product thereof, styrene/butadiene copolymer and hydrogenated product thereof, in which the copolymer may be any of random, block and alternating copolymers.

According to the aforestated process (a), the starting copolymer a or b as produced in the above-mentioned manner can be reacted with a salt of the piperazine derivative represented by the general formula (XIV) or a salt of the diamine represented by the general formula (XV) in the presence of at least one formyl group-containing compound selected from formamide, formic acid, and derivatives thereof, which compound is available from the market. Examples of the formamide derivative include N-methylformamide, N-ethylformamide, N-butylformamide, N-dimethylformamide, N-diethylformamide, N-methylformanilide and N-ethylformanilide, each being nitrogen-substituted formamide. Examples of the formic acid derivative include esters of formic acid such as methyl formate, ethyl formate, propyl formate and butyl formate and salts of formic acid such as sodium formate, potassium formate and ammonium formate. The above-mentioned formamides function not only as the solvent but also as a reaction reagent.

According to the aforestated process (b), the starting copolymer a or b is reacted with the reaction product obtained by reacting in advance the piperazine derivative represented by the general formula (XIV) or the diamine represented by the general formula (XV) with at least one formyl group-containing compound selected from formamide, formic acid and derivatives thereof.

The aforestated process (c) is put into practice in the same manner as in the process (a) except that the reaction is carried out in the absence of a formyl group-containing compound such as formamide, formic acid or a derivative thereof.

Specific examples of the piperazine derivative represented by the general formula (XIV) include N-aminomethylpiperazine; N-aminoethylpiperazine; N-aminopropylpiperazine; N-aminobutylpiperazine; N-aminohexylpiperazine; N-aminooctylpiperazine and N-(4-amino-2,2-dimethylbutyl)piperazine; of which are preferable N-aminoethylpiperazine; N-aminopropylpiperazine; N-aminobutylpiperazine and N-aminohexylpiperazine.

Specific examples of the diamine represented by the general formula (XV) include N-lower alkyl-substituted direct-chain aliphatic diamine such as N-methylmethylenediamine; N-ethylmethylenediamine; N-propylmethylenediamine; N-butylmethylenediamine; N-methylethylenediamine; N-ethylethylenediamine; N-propylethylenediamine; N-butylethylenediamine; N-methyl-1,3-propanediamine; N-ethyl-1,3-propanediamine; N-propyl-1,3-propanediamine; N-butyl-1,3-propanediamine; N-methyl-1,4-butanediamine; N-ethyl-1,4-butanediamine; N-propyl-1,4-butanediamine; N-butane-1,4-butanediamine; N-methyl-1,6-hexanediamine; N-ethyl-1,6-hexanediamine; N-propyl-1,6-hexanediamine; N-butyl-1,6-hexanediamine; N-methyl-1,8-octanediamine; N-ethyl-1,8-octanediamine; N-methyl-1,12-dodecanediamine; N-ethyl-1,12-dodecanediamine; N-propyl-1,12-dodecanediamine; N-butyl-1,12-dodecanediamine; N-methyl-1,18-octadecanediamine; N-ethyl-1,18-octadecanediamine; N-propyl-1,18-octadecanediamine; and N-butyl-1,18-octadecanediamine, N-lower alkyl-substituted branched aliphatic diamine such as N-methyl-2,2,5-trimethyl-1,6-hexanediamine; N-ethyl-2,2,5-trimethyl-1,6-hexanediamine; N-propyl-2,2,5-trimethyl-1,6-hexanediamine; and N-butyl-2,2,5-trimethyl-1,6-hexanediamine, N-lower alkyl-substituted alicyclic diamine such as N-methyl-isophoronediamine; N-ethyl-isophoronediamine; N-propyl-isophoronediamine; N-butyl-isophoronediamine; 1-N-methylaminomethyl-3-aminomethyl-cyclohexane; and 1-N-ethylaminomethyl-3-aminomethyl-cyclohexane, N-lower alkyl-substituted arylalkyldiamine such as N-methyl-m-xylylenediamine; N-ethyl-m-xylylenediamine; N-methyl-p-xylylenediamine; and N-ethyl-p-xylylenediamine, N-lower alkyl-substituted aryldiamine such as N-methyl-p-phenylenediamine; N-ethyl-p-phenylenediamine; N-methyl-m-phenylenediamine; and N-ethyl-p-phenylenediamine, and N-lower alkyl-substituted polyoxyalkylenediamine such as N-methylpolyoxypropylenediamine; and N-ethylpolyoxyethylenediamine.

Among the above-mentioned examples are desirable N-lower alkyl-substituted aliphatic or alicyclic diamine, of which are particularly preferable N-methylethylenediamine, N-ethylethylenediamine; N-methyl-1,3-propanediamine; N-ethyl-1,3-propanediamine; N-methyl-1,4-butanediamine; N-ethyl-1,4-butanediamine; N-methyl-1,6-hexanediamine; and N-ethyl-1,6-hexanediamine.

In the process (a) and process (c), the salt of the above-mentioned piperazine derivative or diamine may be either a partially neutralized salt (monosalt) or a completely neutralized salt (disalt) but the use of the former is preferable because of its higher reaction efficiency.

The aforesaid piperazine and diamine are each preferably used in the form of partially neutralized salt with an acid, which is preferably selected from those each having an acid strength higher than that of a carboxylic acid, and specifically enumerated by sulfuric acid; sulfonic acid such as benzenesulfonic acid, toluenesulfonic acid, toluenesulfonic acid and naphthalenesulfonic acid; halogeno-acid such as hydrochloric acid, hydrofluoric acid, hydrobromic acid and hydroiodic acid; nitric acid; boric acid and phosphoric acid. Among them are preferable hydrochloric acid and toluenesulfonic acid.

In producing a salt of the piperazine derivative or a salt of the diamine each to be used in the process (a) and process (c) for the production of the copolymer as the component [C] according to the present invention, the molar ratio of the piperazine derivative or diamine to the acid is selected so that the resultant salt has a degree of neutralization of 50 to 100% in terms of acid equivalent based on the total amino groups of the piperazine derivative or the diamine. A degree of neutralization thereof less than 50% results in inevitable crosslinkage or gelling at the time of imidization reaction, whereas that exceeding 100% leads to a long time required for imidization reaction, thus causing disadvantage from economical viewpoint. The preferable degree of neutralization is in the range of 50 to 80%.

A salt of the piperazine derivative or a salt of the diamine can be easily prepared by the neutralization reaction between the piperazine derivative or the diamine and the corresponding acid. There may be adopted a method in which the piperazine derivative or diamine is added dropwise to a solution of an acid in an alcohol and the resultant product is concentrated when necessary and recrystallized from an alcohol to isolate the partially neutralized salt to be used as the starting material. There may be also adopted a method in which the piperazine or the diamine and the corresponding acid are formed into the partially neutralized salt to be used for the reaction as such in the presence of a formyl group-containing compound as an essential component in the case of the process (a), while in the case of the process (c), in the presence of an aprotic polar solvent such as 1,3-dimethyl-2-imidazolidinone (DMI); N-methyl-2-pyrrolidone; dimethyl sulfoxide (DMSO); dimethyl sulfone; dioxane; 1,2-dimethoxyethane; hexamethylenephosphoric triamide; and tetramethyl urea. It is preferable in the operation of the process (a) that a salt be formed in a formyl group-containing compound and used as such for the reaction because of its higher efficiency.

In both the process (a) and process (c), the resultant reaction product is brought into contact with a base for the removal of the residual acid.

Another recommendable process for producing the copolymer as the component [C] is the process (b) in which the copolymer having the repeating units I, II and XII or XIII is imidized with and by the use of the reaction product as the reaction reagent, which product is obtained in advance by reacting the piperazine derivative represented by the general formula (XIV) or the diamine represented by the general formula (XV) with the aforestated formyl group-containing compound. The reaction reagent to be used in the process (b) is prepared by subjecting the piperazine derivative or the diamine in an amount of at least one (1), preferably 1.5 to 5 times of mols based on one (1) mol of the formyl group-containing compound to amidization or amide interchange reaction at a temperature of 60° to 180° C., preferably 80° to 150° C. for 2 to 5 hours. In the aforesaid reaction by the use of the formyl group-containing compound, it is preferable to distil away water, an alcohol and ammonia or amine in the case of using formic acid, an ester of formic acid and a formamide, respectively.

The reaction product thus obtained may be employed as such as the imidization reagent. However since the reaction mixture usually contains unreacted piperazine derivative or unreacted diamine, the use of which as such in the imidization reaction causes crosslinkage or gelling, it is preferable to distil away the unreacted piperazine derivative or the unreacted diamine by heating the reaction mixture under reduced pressure or in the case of a high-boiling piperazine derivative or a high-boiling diamine to once neutralize the reaction mixture with hydrochloric acid or the like and remove the dihydrochloride of the piperazine derivative or the diamine by recrystallization.

The processes (a), (b) and (c) are put into practice by reacting the starting copolymer having the repeating units I, II and XII or XIII with a salt of the piperazine derivative represented by the general formula (XIV) or a salt of the diamine represented by the general formula (XV) in the presence or absence of the formyl group-containing compound or by reacting the starting copolymer as mentioned above with the reaction product between the aforesaid piperazine derivative or the diamine and the formyl group-containing compound. The imidization reaction can be carried out in molten state in the absence of a solvent by means of a screw extruder. For the purpose of preventing local reaction and uniformizing the reaction, however, an inert solvent is preferably employed in addition to the formyl group-containing compound that is indispensable in the case of the process (a). Examples of the usable solvent for the aforesaid purpose include aromatic hydrocarbons such as benzene, toluene, xylene, cumene, cymene, ethyltoluene, propyltoluene and diethylbenzene; alicyclic hydrocarbons such as methylcyclopentane, cyclohexane, ethylcyclopentane, methylcyclohexane, 1,1-dimethylcyclohexane and ethylcyclohexane; aliphatic hydrocarbons such as hexane, heptane, octane, decane, methylheptane, 3-ethylhexane and trimethylpentane; and aprotic polar solvent such as DMI, tetramethyl urea, dimethyl sulfone, dioxane, 1,2-dimethoxyethane, hexamethylenephosphoric triamide, DMSO and N-methyl-2-pyrrolidone. In the processes (a), (b) and (c), the reactive substrates that are each considerably different in polarity are reacted with each other, and therefore, it is preferably to simultaneously use a nonpolar solvent and a polar solvent.

The amount of the aforestated solvent to be used is not specifically limited but may be suitably selected according to the situation. It is determined in the range of 0.3 to 20 times, preferably one (1) to 10 times in weight based on the weight of the starting copolymer having the repeating units I, II and XII or XIII to be used as a starting material, that is, the multifunctional copolymer having substituted or non-substituted succinic anhydride as the functional group. An amount thereof less than 0.3 times may result in insufficient dilution effect and highly viscous reaction mixture causing difficulty in handling, whereas that exceeding 20 times will result in failure to develop the effect corresponding to the high usage causing disadvantage from the economical viewpoint.

The ratio by weight of the inert solvent for the purpose of dilution to the formyl group-containing compound as the reaction reagent in the processes (a) and (b) or to the aprotic polar solvent without formyl group in the process (c) (the ratio by weight of the reaction solvent to the formyl group-containing compound or to the aprotic polar solvent) is 40/60 to 100/0, preferably 50/50 to 95/5.

In the case of the process (b) in which is used, as the substrate for imidization reaction, the reaction product between the piperazine derivative or the diamine and the formyl group-containing compound for the production of the copolymer as the component [C], it is not always necessary to use a formyl group-containing compound as the solvent. In the case of the process (a), however, the aforesaid compound is indispensably used not as the solvent but as the reaction reagent in the form of a mixed solvent with an inert solvent for dilution. The proportion of the aforesaid compound to be used is preferably increased in accordance with the proportion of the functional group of the starting material with a view to improving the solubility of the substrate and enhancing the rate of reaction.

In the imidization reaction according to the process (a), (b) or (c), a catalyst is not particularly required but, if used, it is preferably selected from the tertiary amines such as trimethylamine, triethylamine, tributylamine, N,N-dimethylaniline, N,N-diethylaniline and 1-8-diazabicyclo[5,4,0]undec-7ene.

In the above-mentioned processes, the proportions of the starting copolymer, piperazine or salt thereof, diamine or salt thereof and formyl group-containing compound to be used vary depending on the kind of starting material and other conditions and can not be unequivocally determined. However, the ratio of the piperazine derivative or the diamine is usually 1.0 to 10 times, preferably 1.05 to 5.0 times expressed in terms of non-neutralized amino group or unreacted amino group, based on one (1) mol of the substituted or nonsubstituted succinic anhydride group, that is, the repeating unit XII or XIII contained in the starting copolymer. A ratio thereof less than 1.0 unfavorably leads to the residual succinic anhydride group remaining non-imidized even after the end of the reaction and, in the processes (a) and (c), to the possibility of causing gelation by amide crosslinkage due to the reaction between the secondary amino group reproduced in the acid removal step and the aforesaid succinic anhydride group, whereby the effect of the present invention is unfavorably demolished. On the other hand, a ratio thereof exceeding 10 times results in the inevitable economic hardship in the excessively large amount of the reaction reagent required in spite of the advantage in high rate of imidization reaction.

The reaction temperature and reaction time in the processes (a), (b) and (c) vary depending on the type of solvent to be used and whether or not a catalyst is present. The reaction temperature is usually in the range of 100° to 250° C., preferably 110° to 200° C with the reaction time of one (1) to 20 hours. A reaction temperature lower than 100° C. disadvantageously causes a long reaction time required, whereas that higher than 250° C. unfavorably leads to the possibility of coloration of the reaction product along with the thermal decomposition of the introduced formamide groups.

There is incorporated into the reaction product, some amount the amide compound represented by the repeating units X and XI other than III and IV when the reaction is carried out in the presence of a catalyst or at a relatively high temperature or in a high molar ratio of the reaction reagent based on the starting copolymer.

With regard to the ratio of the formamide group to the secondary amino group in the substituent Y of the repeating units III and IV, in the process (a) there is obtained the copolymer having formamide group mingled with the secondary amino group and the formation ratio of the formamide group increases with increase in the reaction temperature and also with increase in the reaction time; in the process (b), there is obtained the copolymer having substantially 100% of the formamide group; and in the process (c), there is obtained the copolymer having substantially 100% of the secondary amino group.

Thus under the above-mentioned reaction conditions, there is obtained the copolymer having a ratio [(III) or (IV)]/[(X) or (XI)] of 100/0 to 30/70 and a ratio (formamide group/secondary amino group) of 100/0 to 30/70.

The composition of the copolymer as the component [C] in the present invention is analyzed, for example, by means of nuclear magnetic resonance spectrum analysis using a carbon isotope ($^{13}$C-NMR) and is specifically shown therein by peak intensity ratios of; carbonyl carbon of imide ring emerging at the chemical shift of 176 to 180 ppm, approx. (W); carbonyl carbon of amide group emerging at the chemical shift of 172 to 174 ppm, approx. (Q); and carbonyl carbon of formamide group emerging at the chemical shift of 162 ppm, approx. (Z).

The order of feeding raw materials for reaction, etc. in the process (a) is not specifically limited but may be selected in a wide variety of manners. In general, the salt in the form of powder or solution produced from the piperazine derivative or diamine and an acid is added to the formyl group-containing compound or the solution thereof in another solvent to form a solution and thereafter to the resultant solution is gradually added the copolymer having the repeating units I, II and XII or XIII, and the reverse order may be adopted. The feeding during the step may be carried out under heating and reflux of a solvent or the formyl group-containing compound.

Likewise, the order of feeding raw materials for reaction, etc. in the process (b) is not specifically limited but may be selected in a wide variety of manners. In general, the starting copolymer having the repeating units I, II and XII or XIII is dissolved in a solvent, and to the resultant homogeneous solution is gradually added the reaction product between the piperazine derivative or the diamine and the formyl group-containing compound, and the reverse order may be adopted. The feeding during the step may be carried out under heating and reflux of a solvent.

The imidization reactions among the starting copolymer, a salt of the piperazine derivative or a salt of the diamine and the formyl group-containing compound and between the starting copolymer and the reaction product of the piperazine derivative or the diamine with the formyl group-containing compound is accompanied by water formation during the progress thereof, thus forming an azeotropic mixture of the solvent and water. The reaction can be efficiently effected by discharging the azeotropic water outside the reaction system by means of a Dean-Stark water separator or the like.

The completion of the imidization reaction can be confirmed by that the azeotropic water formation is no longer observed or that the increase in the absorption capacity of the carbonyl group of the imide ring at around 1700 to 1800 cm$^{-1}$ is no longer observed in infrared (IR) spectrum analysis in which a sample is collected from the resultant reaction mixture.

In the reaction mixture thus obtained is contained a salt of the copolymer as the component [C] in the present invention having the formamide group and/or the secondary amino group that are bonded thereto via imide bond. The resultant salt can be converted to the free amine by a method wherein the reaction mixture as such or, when necessary, after being pulverized by pouring in a non-solvent such as methanol, isopropanol, isobutanol, hexane or water, is brought into contact with an aqueous solution of a base or, when necessary, a mixed solution of a base in methanol/water for the acid removal. Specific examples of the above-mentioned base usable for the acid removal include a water-soluble base such as sodium hydroxide, potassium hydroxide, lithium hydroxide, sodium carbonate, potassium carbonate, sodium hydrogencarbonate, potassium hydrogencarbonate, ammonia, methylamine, ethylamine, trimethylamine and triethylamine. Among those are preferable sodium hydroxide, sodium carbonate and sodium hydrogencarbonate from the economic viewpoint. In the process (b), the acid removal step is dispersed with, since a salt of the copolymer is not produced.

The copolymer having the formamide group only without the amino group can easily purified by pouring the reaction mixture in methanol, isopropanol, isobutanol, hexane or water as mentioned above and recovering the resultant precipitate as powdery product.

In the resin composition of the present invention comprising the components [A], [B] and [C] as the principal components, the ratio by weight of the component [A] shall be 5 to 95%, preferably 30 to 95% based on the total amount of [A] and [B] and the ratio by weight of the component [B] shall be 95 to 5%, preferably 70 to 5% based on the same. A ratio of [A] or [B] outside the above range results in disadvantage of deteriorated moldability or decrease in mechanical strength such as rigidity for the resin composition. The ratio by weight of the component [C] is selected in the range of 0.05 to 20 parts, preferably 0.5 to 10 parts based on the total amount of [A] and [B] of 100 parts by weight. A compounding ratio of [C] less than 0.05 part by weight causes insufficient effect on improving various physical properties, especially surface impact strength for the resultant resin composition, whereas that exceeding 20 parts by weight results in failure to develop the improvement in the effect corresponding to the compounding ratio, thus causing economic hardship as well as deterioration of physical property balancing.

The resin composition of the present invention comprising the components [A], [B] and [C] as the principal components may be further incorporated, when necessary, with other additive such as reinforcing material (e.g. glass fiber and carbon fiber), inorganic filler, thermal stabilizer, antioxidant, light stabilizer, flame retardant, weathering agent, plasticizer, antistatic agent, mold-releasing agent, foaming agent or the like.

In preparing the composition of the present invention, each of the above-mentioned components is kneaded in the heat-molten state by the use of a single screw extruder, a twin screw extruder, a Banbury mixer, a kneading roll, a Brabender, a kneading machine such as a kneader, a mixer such as a Henschel mixer or the like. The order of kneading is not specifically limited but may be suitably selected. The kneading temperature varies depending on the type of the component, compounding amount, the aimed physical properties of the composition to be produced, etc. and is not unequivocally determined. It is selected usually in the range of 180° to 340° C.

The resin composition of the present invention can be prepared by kneading the components [A], [B] and [C] in suitable combination. Taking into consideration the miscibility among the components, for example, an olefinic polymer as the component [B] is preferably combined with an olefinic compound having formamide group and/or amino group as the component [C] such as ethylene/ethyl acrylate/maleic anhydride copolymer having formamide group and/or amino group, and a styrenic polymer as the component [B] is preferably combined with a styrenic compound having formamide group and/or amino group as the component [C] such as styrene/maleic anhydride copolymer having formamide group and/or amino group, and so forth.

The present invention can provide a resin composition excellent in impact strength, especially surface impact strength as well as Izod impact strength, weather resistance and solvent resistance and free from the problems with delamination, peeling or unfavorable appearance by virtue of compounding the mixed system between an engineering plastics and a general-purpose resin with a copolymer having formamide group and/or amine group which copolymer is minimized in gelling.

Accordingly, the resin composition of the present invention is expected to find a wide variety of useful applications in the fields of automobile interior materials, housing materials for office automation machinery and apparatus, electrical home appliances.

In the following, the present invention will be described in more detail with reference to reference examples, preparation examples, working examples (simplified as "examples") and comparative examples, which however shall not be construed to limit the present invention thereto.

Reference Example 1

Preparation of partially neutralized salt of N-(2-aminoethyl)piperazine with p-toluenesulfonic acid A 1 liter flask equipped with a thermometer, a stirrer, a dropping funnel and a reflux condenser was charged with 300 ml of methanol and 95 g (0.5 mol) of p-toluenesulfonic acid monohydrate to prepare a solution. To the resultant solution was added dropwise a solution of 323 g (2.5 mols) of N-2-aminoethyl)piperazine in 300 ml of methanol on an ice bath at such a rate that the temperature of the mixed solution was maintained at 10° to 20° C. After the completion of the dropwise addition, the mixed solution was heated to 70° C. and then distilled at reduced pressure to distil away the methanol and unreacted N-(2-aminoethyl)piperazine and deposit 170.2 g of a white solid. The white solid thus obtained was taken out from the flask, slurried with 300 ml of toluene, filtered and further washed twice with 100 ml each of toluene to obtain white powders, which were dried under reduced pressure. The white powders obtained at a yield of 142.9 g were titrated with 0.5N hydrochloric acid (HCl) by the use of bromophenol blue as the indicator to determine the neutralization equivalent and the degree of neutralization. The results are given in Table 1.

Reference Example 2

Preparation of partially neutralized salt of N-(2-aminoethyl)piperazine with hydrochloric acid The procedure in Reference Example 1 was repeated by the use of the same flask as that used therein as the reaction vessel except that 35% aqueous solution of hydrogen chloride (35% hydrochloric acid) was employed in place of p-toluenesulfonic acid to prepare white powders of N-(2-aminoethyl)piperazine monohydrochloride. The neutralization equivalent and the degree of neutralization for the monohydrochloride were determined in the same manner as in Reference Example 1. The results are given in Table 1.

Reference Example 3

Preparation of partially neutralized salt of N-(3-aminopropyl)piperazine with p-toluenesulfonic acid In the same manner as in Reference Example 1,95 g (0.5 mol) of p-toluenesulfonic acid monohydrate was dissolved in 500 ml of dimethylformamide (DMF) at room temperature. To the resultant solution was gradually added 64.5 g (0.45 mol) of N-(3-aminopropyl)piperazine to dissolve it and prepare a solution of partially neutralized salt of N-(3-aminopropyl) piperazine with p-toluenesulfonic acid in DMF so that the resultant solution temperature might not exceed 20° C. The neutralization equivalent and the degree of neutralization based on the solid content for the resultant salt are given in Table 1.

Reference Example 4

Preparation of partially neutralized sail of N-(6-aminohexyl)piperazine with p-toluenesulfonic acid In the same manner as in Reference Example 1,95 g (0.5 mol) of p-toluenesulfonic acid monohydrate was dissolved in 500 ml of 1,3-dimethyl-2-imidazolidinone (DMI) at room temperature. To the resultant solution was gradually added 83.3 g (0.45 mol) of N-(6-aminohexyl)piperazine to dissolve it and prepare a solution of partially neutralized salt of N-(6-aminohexyl)piperazine with p-toluenesulfonic acid in DMI so that the resultant solution temperature might not exceed 20° C. The neutralization equivalent and the degree of neutralization based on the solid content of the resultant partially neutralized salt are given in Table 1.

Reference Example 5

The procedure in Reference Example 4 was repeated to prepare the salt of N-(4-aminobutyl)piperazine with the salt except that N-(4-aminobutyl)piperazine was used as the piperazine derivative.

The neutralization equivalent of the residue thus obtained as determined by neutralization titration is given in Table 1.

Reference Example 6

Preparation of a reaction product between N-(2-aminoethyl)piperazine and formamide The same reaction vessel as that used in Reference Example 1 was charged with 646 g (5.0 mol) of N-(2-aminoethyl)piperazine, to which was gradually added dropwise 45 g (1.0 mol) of formamide at room temperature. After the completion of the dropwise addition, the mixture was heated at 80° to 120° C. to react them for 9 hours, during which time the evolution of ammonia gas was observed. After the completion of the reaction, the unreacted N-(2-aminoethyl)piperazine was distilled away to obtain a residue. The reaction product thus obtained was subjected to the determination by means of the neutralization titration, and the results are given in Table 1.

Reference Example 7

Preparation of a reaction product between N-(3-aminopropyl)piperazine and DMF

Substantially the procedure in Reference Example 5 was repeated to gradually add DMF dropwise to N-(3-aminopropyl)piperazine and react them at room temperature without the use of p-toluenesulfonic acid. The resultant reaction mixture was dissolved in a solvent (ethanol/water=7/3 (ratio by volume)). The solution was neutralized with a 35% hydrochloric acid, concentrated, recrystallized and filtered to remove a crystal of N-(3-aminopropyl)piperazine hydrochloride. The concentrated residue thus obtained was subjected to the determination by means of the potentiometric titration, and the results are given in Table 1.

Reference Example 8

Preparation of partially neutralized salt of N-ethylethylenediamine with p-toluenesulfonic acid A 1 liter flask-equipped with a thermometer, a stirrer, a dropping funnel and a reflux condenser was charged with 300 ml of methanol and 95 g (0.5 mol) of p-toluenesulfonic acid monohydrate to prepare a solution. To the resultant solution was added dropwise a solution of 220 g (2.5 mols) of N-ethylethylenediamine in 300 ml of methanol while cooling the solution on an ice bath at such a rate that the temperature of the mixed solution was maintained at 10° to 20° C. After the completion of the dropwise addition, the mixed solution was heated to 70° C. and then distilled at reduced pressure to distil away the methanol and unreacted N-ethylethylenediamine and deposit 140.3 g of a white solid. The white solid thus obtained was taken out from the flask, slurried with 300 ml of toluene, filtered and further washed twice with 100 ml each of toluene to obtain white powders, which were dried under reduced pressure. The dried white powders obtained at a yield of 124.8 g were titrated with 0.5N hydrochloric acid (HCl) by the use of bromophenol blue as the indicator to determine the neutralization equivalent and the degree of neutralization. The results are given in Table 1.

Reference Example 9

Preparation of partially neutralized salt of N-ethylethylenediamine with hydrochloric acid The procedure in Reference Example 8 was repeated by the use of the same flask as that used therein as the reaction vessel except that 35% aqueous solution of hydrogen chloride (35% hydrochloric acid) was employed in place of p-toluenesulfonic acid to prepare white powders of N-ethylethylenediamine monohydrochloride. The neutralization equivalent and the degree of neutralization for the monohydrochloride were determined in the same manner as in Reference Example 8. The results are given in Table 1.

Reference Example 10

Preparation of partially neutralized salt of N-methyl-1,6-hexanediamine with p-toluenesulfonic acid In the same manner as in Reference Example 8, 95 g (0.5 mol) of p-toluenesulfonic acid monohydrate was dissolved in 500 ml of dimethylformamide (DMF) at room temperature. To the resultant solution was gradually added 58.5 g (0.45 mol) of N-methyl-1,6-hexanediamine to dissolve it and prepare a solution of partially neutralized salt of N-methyl-1,6-hexanediamine with p-toluenesulfonic acid in DMF so that the resultant solution temperature might not exceed 20° C. The neutralization equivalent and the degree of neutralization for the salt thus obtained are given in Table 1.

Reference Example 11

Preparation of partially neutralized salt of N-methyl-1,6-hexanediamine with p-toluenesulfonic acid In the same manner as in Reference Example 8, 95 g (0.5 mol) of p-toluenesulfonic acid monohydrate was dissolved in 500 ml of 1,3-dimethyl-2-imidazolidinone (DMI) at room temperature. To the resultant solution was gradually added 58.5 g (0.45 mol) of N-methyl-1,6-hexanediamine to dissolve it and prepare a solution of partially neutralized salt of N-methyl-1,6-hexanediamine with p-toluenesulfonic acid in DMI so that the resultant solution temperature might not exceed 20° C. The neutralization equivalent and the degree of neutralization based on the solid content of the resultant partially neutralized salt are given in Table 1.

Reference Example 12

The procedure in Reference Example 11 was repeated to prepare the salt of N-ethyl-1,4-butanediamine with the acid except that N-ethyl-1,4-butanediamine was used as the diamine.

The neutralization equivalent of the residue as determined by means of neutralization titration is given in Table 1.

Reference Example 13

Preparation of a reaction product between N-ethylethylenediamine and formamide

The same reaction vessel as that used in Reference Example 8 was charged with 440 g (5.0 mol) of N-ethylethylenediamine, to which was gradually added dropwise 45 g (1.0 mol) of formamide at room temperature. After the completion thereof, the mixture was heated at 80° to 120° C. to react them for 9 hours, during which time the evolution of ammonia gas was observed. After the completion of the reaction, the unreacted N-ethylethylenediamine was distilled away at 61° C./88 mmHg to obtain a residue. The reaction product thus obtained was subjected to the determination by means of the neutralization titration, and the neutralization equivalent thus determined is given in Table 1.

Reference Example 14

Preparation of a reaction product between N-methyl-1,3-propanediamine and DMF

Substantially the procedure in Reference Example 12 was repeated to gradually add DMF dropwise to N-methyl-1,3-propanediamine and react them at room temperature without the use of p-toluenesulfonic acid. The resultant reaction mixture was dissolved in a solvent (ethanol/water=7/3 (ratio by volume)) and the resultant solution was neutralized with 35% hydrochloric acid, then concentrated, recrystallized and filtered to remove a crystal of N-methyl-1,3-propanediamine hydrochloride. The concentrated residue thus obtained was subjected to the determination by means of the potentiometric titration, and the results are given in Table 1.

TABLE 1

| | Piperazine derivatives or diamines | Acid | Sovents or formyl group containing compounds to be used | Concentration of the solid content of salts (%) | Neutralization equivalent (meq/g) | Degree of neutrali- zation (%) |
|---|---|---|---|---|---|---|
| Reference Example 1 | N-(2-aminoethyl) piperazine | p-Toluene sulfonic acid | None | 100 | 3.22 | 51.0 |
| Reference Example 2 | N-(2-aminoethyl) piperazine | Hydrochloric acid | None | 100 | 5.82 | 51.5 |
| Reference Example 3 | N-(2-aminopropyl) piperazine | p-Toluenesulfonic acid | DMF | 20.0 | 2.58 | 56.5 |
| Reference Example 4 | N-(2-aminohexyl) piperazine | p-Toluenesulfonic acid | DMI | 24.4 | 2.40 | 55.1 |
| Reference Example 5 | N-(2-aminobutyl) piperazine | p-Toluenesulfonic acid | DMI | 25.0 | 2.73 | 53.5 |
| Reference | N-(2-aminoethyl) | — | Formamide | — | 6.41 | — |

TABLE 1-continued

| | Piperazine derivatives or diamines | Acid | Sovents or formyl group containing compounds to be used | Concentration of the solid content of salts (%) | Neutralization equivalent (meq/g) | Degree of neutralization (%) |
|---|---|---|---|---|---|---|
| Example 6 | piperazine | | | | | |
| Reference Example 7 | N-(2-aminopropyl) piperazine | — | DMF | — | 5.95 | — |
| Reference Example 8 | N-ethylethylene-diamine | p-Toluenesulfonic acid | None | 100 | 3.73 | 50.9 |
| Reference Example 9 | N-ethylethylene-diamine | Hydrochloric acid | None | 100 | 7.74 | 51.4 |
| Reference Example 10 | N-methyl-1,6-hexanediamine | p-Toluenesulfonic acid | DMF | 22.5 | 2.85 | 55.0 |
| Reference Example 11 | N-methyl-1,6-hexanediamine | p-Toluenesulfonic acid | DMI | 20.0 | 3.08 | 56.5 |
| Reference Example 12 | N-ethyl-1,4-butanediamine | p-Toluenesulfonic acid | DMI | 24.9 | 3.16 | 52.9 |
| Reference Example 13 | N-ethylethylene-diamine | — | Formamide | — | 8.59 | — |
| Reference Example 14 | N-methyl-1,3-propanediamine | — | DMF | — | 8.54 | — |

Reference Example 15

Preparation of maleic anhydride-grafted polypropylene: Refer to Japanese Patent Application Publication No. 9925/1981

100 parts by weight of powdery crystalline polypropylene having a weight-average molecular weight (Mw) of 60,000 with a number-average molecular weight (Mn) of 24,000, 12 parts by weight of maleic anhydride and 4 parts of weight of dicumyl peroxide were preliminarily blended with each other and subjected to extrusion reaction with an extruder having a screw diameter of 30 mm and an aspect ratio (ratio of screw length to screw width) of 28 at a barrel temperature set at 230° C. and a number of screw revolution of 60 rpm. The resultant grafted product thus discharge from the extruder was ground, immersed in acetone to remove unreacted maleic anhydride by extraction and dried to afford maleic anhydride-grafted polypropylene resin (1) with a grafted amount by maleic anhydride of 4.5% by weight. The resin thus obtained had an Mw of 15,000 with an Mn of 6,500 expressed in terms of polystyrene as determined by gel permeation chromatography (GPC).

Reference Example 16

In the same manner as in Reference Example 15 maleic anhydride-grafted copolymers (2) to (6) were obtained as given in Table 2.

Reference Example 17

By the use of the publicly known method, maleic anhydride copolymers (7) to (10) were obtained as given in Table 3.

TABLE 2

| Number of copolymer | Starting copolymer | Amount of grafted maleic anhydride (wt %) |
|---|---|---|
| (2) | An ethylene-propylene copolymer (Weight ratio 7/3, Mw = 90000, Mn = 41000) | 0.5 |
| (3) | An ethylene-ethylacrylate copolymer (Weight ratio 7/3, Mw = 40000, Mn = 15000) | 8.1 |
| (4) | A hydrogenated product of a styrene butadiene-copolymer (weight ratio 2/8, Mw = 42000, Mn = 41000) | 1.0 |
| (5) | A polyolefin elastomer (Supplied by Exxon, VA1801) | 0.7 |
| (6) | A hydrogenated product of a styrene-isoprene copolymer (Weight ratio 3/7, Mw = 41000, Mn = 18200) | 3.1 |

TABLE 3

| Number of copolymer | Monomer composition | | | | | | Molecular weight | |
|---|---|---|---|---|---|---|---|---|
| | Monomer (A) | | Monomer (B) | | Monomer (C) | | | |
| | Kind | Mol % | Kind | Mol % | Kind | Mol % | Mw | Mn |
| (7) | Styrene | 95 | Maleic anhydride | 5 | — | — | 52000 | 25000 |
| (8) | Styrene | 75 | Maleic anhydride | 25 | — | — | 12000 | 5000 |
| (9) | Ethyrene | 90 | Ethyl acrylate | 5 | Maleic anhydride | 5 | 30000 | 13000 |
| (10) | Ethyrene | 88 | Ethyl acrylate | 10 | Maleic anhydride | 2 | 50000 | 20000 |

Preparation Example 1

A 1 liter flask equipped with a thermometer, a stirrer, a dropping funnel and a Dean-Stark water separator was charged with 300 ml of xylene and 120 g of the maleic anhydride polypropylene (1) as prepared in Reference Example 15, which was dissolved in the xylene with heating under the reflux thereof at 140° C.

Then, to the resultant solution was gradually added dropwise a solution of 12.0 g of the reaction product of N-(2-aminoethyl)piperazine with formamide as prepared in Reference Example 6 in 200 ml of DMF over a period of 3 hours, while the mixed reaction solution was maintained at the reflux temperature of xylene and the azeotropic water resulting from imidization reaction was discharged outside the reaction system by means of the Dean-Stark water separator.

The reaction was further continued at 140° C. for 10 hours until the completion thereof where the azeotropic water formation was no longer observed. Subsequently the mixed reaction product was poured into 5 liters of methanol to recover the product as precipitated, which was washed with methanol and dried giving a yield of 126.4 o The resultant copolymer was in the form of white powder, soluble in xylene and dissolved in xylene into 10% by weight of the solution to measure the viscosity at 25° C. by means of a Brookfield type viscometer. The result was 140 cPs.

A solution of the copolymer in xylene was made into cast films which were subjected to IR spectrum analysis. As a result, the absorption based on formamide was observed at 1662 cm$^{-1}$ (shoulder) and 1531 cm$^{-1}$ in addition to the absorption based on imide ring at 1775 cm$^{-1}$ and 1704 cm$^{-1}$, but there was not observed the absorption based on amino group.

Aside from the above, the copolymer was subjected to nuclear magnetic resonance spectrum analysis in CDCl$_3$ using a carbon isotope ($^{13}$C-NMR). As a result, there emerged a peak assigned to the carbonyl carbons of imide rings at 176 to 180 ppm at an intensity ratio of 2.00 and a peak indicating the existence of the carbonyl carbons of formamide at 162 ppm at an intensity ratio of 1.00, but a peak indicating the existence of the carbonyl carbons of amide group at 172 to 174 ppm did not emerge.

As the result of the $^{13}$C-NMR analysis, the functional group ratio in molar ratio was determined to be (IV)/(XI)= 100/0 and formamide group/secondary amino group=100/0.

Preparation Example 2

A 1 liter flask equipped with a thermometer, a stirrer, a dropping funnel and a Dean-Stark water separator was charged with 80 ml of DMF and 8 g of the reaction product of N-(3-aminopropyl)piperazine with DMF as prepared in Reference Example 7, which was dissolved in the DMF with heating to 80° C.

Then, to the resultant solution was gradually added dropwise a solution of 71 g of the styrene/maleic anhydride (95:5 molar ratio) copolymer [(7); Mw=52,000, Mn=25,000] as prepared in Reference Example 17 in 350 ml of xylene.

After the completion of the dropwise addition, a sample was taken from the mixed reaction product and subjected to infrared (IR) spectrum analysis. As a result, the absorption based on the anhydride ring at 1780 cm$^{-1}$ had completely disappeared.

Heating for temperature raising of the mixed reaction product was continued to boil water at around 140° C. as the azeotrope with the refluxed xylene, and the boiled water was condensed and separated with the Dean-Stark water separator. The reaction was further continued at 140° C. for 9 hours until the completion thereof where the azeotropic water formation was no longer observed. Subsequently the mixed reaction product was poured into 5 liters of methanol to recover the product as precipitate, which was washed with methanol and dried giving a yield of 73.4 g.

The resultant copolymer was in the form of white powder, soluble in toluene and dissolved in toluene into 10% by weight of the solution in toluene to measure the viscosity at 25° C. by means of a Brookfield type viscometer. The result was 700 cPs.

A solution of the copolymer in toluene was made into cast films, which were subjected to IR spectrum analysis. As a result, the absorption based on formamide was observed at 1665 cm$^{-1}$ (shoulder) in addition to the absorption based on imide rings at 1775 cm$^{-1}$ and 1695 cm$^{-1}$, but there was not observed the absorption based on amine group.

Aside from the above, the copolymer was subjected to nuclear magnetic resonance spectrum analysis in CDC$_3$ using a carbon isotope ($^{13}$C-NMR). As a result, there emerged a peak assigned to the carbonyl carbons of imide ring at 176 to 180 ppm at an intensity ratio of 2.00 and a peak indicating the existence of the carbonyl carbons of formamide at 162 ppm at an intensity ratio of 1.00, but a peak indicating the existence of the carbonyl carbons of amide group at 172 to 174 ppm did not emerge.

As the result of the $^{13}$C-NMR analysis, the functional group ratio in molar ratio was determined to be (III)/(X)= 100/0 and formamide group/secondary amino group=100/0.

Preparation Examples 3 to 10

The procedure in Preparation Example 1 or 2 was repeated except that there were employed the products as obtained in Reference Examples 1 to 7 as the piperazine derivative salt or the reaction product of a piperazine derivative with a formyl group-containing compound; and the copolymers as described in Reference Examples 15 to 17 as the starting copolymer. However, in Examples 3, 4 and 7 to 10, the mixed imidization reaction product was poured in methanol to recover the precipitate, which was immersed in a water/methanol solution (1:1 by volume) containing 8.0 g of potassium carbonate overnight, filtered, thoroughly washed with water and methanol, dried and prepared. The results obtained are given in Table 4.

Measurements were made also of the viscosities of the copolymers thus obtained, which results are given in Table 4.

TABLE 4

| Preparation Examples | Starting compolymer Kind | Amount (g) | Salts of piperazine derivatie or formyl compounds Kind | Amount (g) |
|---|---|---|---|---|
| 3 | A maleically modified ethylene-propylene copoymer (2) | 100 | A PTS salt* of a N-(4-aminobutyl) piperazine (Reference Example 5) | 2.8 |
| 4 | A maleically modified ethylene-ethyl acrylate copolymer (3) | 100 | A PTS salt* of a N-(6-aminohexyl) piperazine (Reference Example 4) | 68.9 |
| 5 | A maleically modified hydrogenated styrene-butadiene copolymer (4) | 60 | A reaction product between a N-(2-aminoethyl)piperazine and a formamide (Reference Example 6) | 1.4 |
| 6 | A maleically modified polyolefin elastomer (5) | 120 | A reaction product between a N-(3-aminopropyl)piperazine and a DMF (Reference Example 7) | 2.1 |
| 7 | A maleically modified hydrogenated styrene-isoprene copolymer (6) | 100 | A PTS salt* of a N-(2-aminoethyl) piperazine (Reference Example 1) | 13.4 |
| 8 | A styrene-maleic anhydride (75/25) copolymer (8) | 70 | A N-(2-aminoethyl)piperazine hydrochloride (Reference Example 2) | 39.6 |
| 9 | An ethylene-ethyl acrylate-maleic anhydride (90/5/5) copolymer (9) | 100 | A PTS salt* of a N-(6-aminohexyl) piperazine (Reference Example 4) | 64.2 |
| 10 | An ethylene-ethyl acrylate-maleic anhydride (88/10/2) copolymer (10) | 100 | A PTS salt* of a N-(3-aminopropyl) piperazine (Reference Example 3) | 24.9 |

| Preparation Examples | Reaction solvents Solvents I Kind | Amount (ml) | Solvents II Kind | Amount (ml) | Reaction conditions Temperature (°C.) | Hour (hr) | yield (g) |
|---|---|---|---|---|---|---|---|
| 3 | DMI | 30 | Xylene | 500 | 140 | 10 | 100.5 |
| 4 | DMI | 200 | Cumene | 400 | 153 | 12 | 110.4 |
| 5 | DMF | 50 | Xylene | 600 | 140 | 1 | 60.2 |
| 6 | DMF | 100 | Xylene | 400 | 140 | 5 | 122.2 |
| 7 | DMF | 100 | Xylene | 500 | 140 | 6 | 103.4 |
| 8 | DMF | 200 | Cumene | 400 | 153 | 12 | 86.3 |
| 9 | DMI | 200 | Xylene | 400 | 140 | 12 | 119.6 |
| 10 | DMF | 100 | Xylene | 400 | 140 | 7 | 103.3 |

| Preparation Examples | Viscosity and appearance of copolymers Solvent used | Viscosity (cps) | Appearance (color) | Infrared absorption spectrum (cm$^{-1}$) |
|---|---|---|---|---|
| 3 | Xylene | 1050 | — | 3285 amino group (trace) 1772 Imide group, 1700 Imide ring |
| 4 | Xylene | 560 | — | 3280 amino group, 1666 Shoulder 1772 Imide ring, 1528 amide group 1698 Imide ring |
| 5 | Xylene | 760 | White | 1780 Imide ring, 1705 Imide ring 1667 Shoulder |
| 6 | Xylene | 2300 | White | 1775 Imide ring, 1698 Imide ring 1665 Shoulder |
| 7 | Xylene | 590 | White | 3287 amino group, 1773 Imide ring 1700 Imide ring, 1660 Shoulder |
| 8 | Xylene | 144 | White | 3284 amino group, 1785 Imide ring 1706 Imide ring, 1664 Shoulder 1528 amide group |
| 9 | Xylene | 510 | — | 3290 amino group, 1770 Imide ring 1695 Imide ring, |

TABLE 4-continued

| 10 | Xylene | 756 | White | 3295 amino group, 1750 Imide ring |
|---|---|---|---|---|
|   |   |   |   | 1700 Imide ring, 1667 Shoulder |

| Preparation Examples | $^{13}$C-NMR spectrum (Intensity ratio) | | | Ratio of functional groups | |
|---|---|---|---|---|---|
|   | W | Q | Z | (III) or (IV)/(X) or (XI) | Formamide group/ secondary amino group |
| 3 | 2.00 | not detected | not detected | 100/0 | 0/100 |
| 4 | 2.00 | 0.105 | not detected | 95/5 | 0/100 |
| 5 | 2.00 | not detected | 1.00 | 100/0 | 100/0 |
| 6 | 2.00 | not detected | 1.00 | 100/0 | 100/0 |
| 7 | 2.00 | not detected | 0.63 | 100/0 | 63/37 |
| 8 | 2.00 | 0.33 | 1.24 | 75/25 | 93/7 |
| 9 | 2.00 | not detected | not detected | 100/0 | 0/100 |
| 10 | 2.00 | not detected | 0.83 | 100/0 | 83/17 |

*PTS salt: p-toluenesulfonate

Preparation Example 11

The procedure in Preparation Example 1 was repeated except that 8.9 g of the reaction product of N-ethylethylenediamine and formamide as prepared in Reference Example 13 was employed in place of the reaction product of N-(2-aminoethyl)piperazine and formamide (refer to Reference Example 6).

The copolymer was obtained in a yield of 125.3 g in the form of white powder, soluble in xylene and dissolved in xylene into 10% by weight of the solution in xylene to measure the viscosity at 25° C. by means of a Brookfield type viscometer. The result was 145 cPs.

A solution of the copolymer in xylene was made into cast films, which were subjected to IR spectrum analysis. As a result, the absorption based on formamide was observed at 1662 cm$^{-1}$ (shoulder) in addition to the absorption based on imide rings at 1772 cm$^{-1}$ and 1700 cm$^{-1}$, but there was not observed the absorption based on amino group.

Aside from the above, the copolymer was subjected to nuclear magnetic resonance spectrum analysis in CDCl$_3$ using a carbon isotope ($^{13}$C-NMR). As a result, there emerged a peak assigned to the carbonyl carbons of imide ring at 176 to 180 ppm at an intensity ratio of 2.00 and a peak indicating the existence of the carbonyl carbons of formamide at 162 ppm at an intensity ratio of 1.00, but a peak indicating the existence of the carbonyl carbons of amide group at 172 to 174 ppm did not emerge.

As the result of the $^{13}$C-NMR analysis, the functional group ratio in molar ratio was determined to be (IV)/(XI)=100/0 and formamide group/secondary amino group=100/0.

Preparation Example 12

The procedure in Preparation Example 2 was repeated except that 5.6 g of the reaction product of N-methyl-1,3-propanediamine and DMF as prepared in Reference Example 14 was employed in place of the reaction product of N-(3-aminopropyl)piperazine (Reference Example 7).

In the IR spectrum analysis carried out after the completion of dropwise addition of styrene/maleic acid copolymer (7), the absorption based on the anhydride ring at 1780 cm$^{-1}$ had completely disappeared.

The copolymer was obtained in a yield of 73.8 g in the form of white powder, soluble in toluene and dissolved in toluene into 10% by weight of the solution in toluene to measure the viscosity at 25° C. by means of a Brookfield type viscometer. The result was 690 cPs.

A solution of the copolymer in toluene was made into cast films, which were subjected to IR spectrum analysis. As a result, the absorption based on formamide was observed at 1665 cm$^{-1}$ (shoulder) in addition to the absorption based on imide rings at 1775 cm$^{-1}$ and 1665 cm$^{-1}$, but there was not observed the absorption based on amino group.

Aside from the above, the copolymer was subjected to nuclear magnetic resonance spectrum analysis in CDCl$_3$ using a carbon isotope ($^{13}$C-NMR). As a result, there emerged a peak assigned to the carbonyl carbons of imide ring at 176 to 180 ppm at an intensity ratio of 2.00 and a peak indicating the existence of the carbonyl carbons of formamide at 162 ppm at an intensity ratio of 1.00, but a peak indicating the existence of the carbonyl carbons of amide group at 172 to 174 ppm did not emerge.

As the result of the $^{13}$C-NMR analysis, the functional group ratio in molar ratio was determined to be (III)/(X)=100/0 and formamide group/secondary amino group=100/0.

Preparation Examples 13 to 20

The procedure in Preparation Example 11 or 12 was repeated except that there were employed the products as obtained in Reference Examples 8 to 14 as the diamine salt or the reaction product of a diamine with a formyl group-containing compound; and the copolymers as described in Reference Examples 15 to 17 as the starting copolymer. However, in Examples 13, 14, and 17 to 20, the potassium carbonate-treatments were carried out in the same manner as in Preparation Example 3.

The results obtained are given in Table 5.

Preparation Example 21

An attempt was made to proceed with reaction by the use of the starting raw material same as in Preparation Example 11 except that there were used 5.3 g of N-ethylethylenediamine in place of the reaction product of N-ethylethylenediamine with formamide; and o xylene in place of DMF. However, immediately after the dropwise addition of ⅓ of the solution of N-ethylethylenediamine, the reaction mixture turned out to be highly viscous, but the reaction was continued to proceed with imidization reaction. The resultant reaction mixture was poured into 5 liters of methanol, washed with methanol and dried. The copolymer thus obtained was dissolved in tetralin at 100° C. to form 10% by weight of the solution, the Brookfield viscosity of which was measured at 100° C. The result was 5300 cPs, which led to the judgement that a partially crosslinked product had been formed during the course of reaction.

Preparation Example 22

An attempt was made to proceed with reaction by the use of the starting raw material same as in Preparation Example 12 except that there were used 5.1 g of N-methyl-1,3-propanediamine in place of the reaction product of N-methyl-1,3-propanediamine with DMF; and xylene in place of DMF. However, immediately after the start of distilling out of the azeotrope in the step of heating for temperature raising after the completion of the dropwise addition of the solution of styrene/maleic anhydride-modified product, the reaction mixture turned out to be highly viscous, but the reaction was still continued to proceed with the dehydration.

The resultant reaction mixture was poured into 5 liters of methanol, washed with methanol and dried. The copolymer thus obtained was dissolved in xylene to form 10% by weight of the solution, the Brookfield viscosity of which was measured at 25° C. The result was 7500 cPs, which led to the judgement that a partially crosslinked product had been formed during the course of reaction.

TABLE 5

| Preparation Examples | Starting copolymer Kind | Amount (g) | Salts of diamine or formyl group-containing compounds Kind | Amount (g) |
|---|---|---|---|---|
| 13 | A maleically modified ethylene-propylene copoymer (2) | 100 | A PTS salt* of a N-ethylene-1,4-butanediamine Reference Example 12) | 2.4 |
| 14 | A maleically modified ethylene-ethyl acrylate copolymer (3) | 100 | A PTS salt* of a N-methyl-1,6-hexanediamine (Reference Example 11) | 56.8 |
| 15 | A maleically modified hydrogenated styrene-butadiene copolymer (4) | 60 | A reaction product between a N-ethylethylnediamine and a formamide (Reference Example 13) | 1.0 |
| 16 | A maleically modified Polyolefin elastomer (5) | 120 | A reaction product between a N-methyl-1,3-propane-diamine and a DMF (Reference Example 14) | 1.4 |
| 17 | A maleically modified hydrogenated styrene-isoprene copolymer (6) | 100 | A PTS salt* of a N-ethylethylene-diamine (Reference Example 8) | 17.0 |
| 18 | A styrene-maleic anhydride (75/25) copolymer (8) | 70 | A N-ethylethylenediamine hydrochloride (Reference Example 9) | 30.9 |
| 19 | An ethylene-ethyl acrylate-maleic anhydride (90/5/5) copolymer (9) | 100 | A PTS salt* of a N-methyl-1,6-hexanediamine (Reference Example 11) | 52.9 |
| 20 | An ethylene-ethyl acrylate-maleic anhydride (88/10/2) copolymer (10) | 100 | A PTS salt* of a N-methyl-1,6-hexanediamine (Reference Example 11) | 24.3 |

| Preparation Examples | Reaction solvents Solvents I Kind | Amount (ml) | Solvents II Kind | Amount (ml) | Reaction conditions Temperature (°C.) | Hour (hr) | yield (g) |
|---|---|---|---|---|---|---|---|
| 13 | DMI | 30 | Xylene | 500 | 140 | 8 | 100.4 |
| 14 | DMI | 200 | Cumene | 400 | 153 | 12 | 106.0 |
| 15 | DMF | 40 | Xylene | 600 | 140 | 6 | 61.1 |
| 16 | DMF | 80 | Xylene | 450 | 140 | 5 | 122.5 |
| 17 | DMF | 110 | Xylene | 400 | 140 | 7 | 102.4 |
| 18 | DMF | 200 | Cumene | 400 | 153 | 12 | 85.5 |
| 19 | DMI | 200 | Xylene | 400 | 140 | 11 | 112.2 |
| 20 | DMF | 100 | Xylene | 400 | 140 | 8 | 104.4 |

| Preparation Examples | Solvent used | Viscosity and appearance of copolymers Viscosity (cps) | Appearance (color) | Infrared absorption spectrum (cm$^{-1}$) |
|---|---|---|---|---|
| 13 | Xylene | 1160 | — | 3325 amino group (trace) 1774 Imide group, 1700 Imide ring |
| 14 | Xylene | 550 | — | 3310 amino group, 1770 Imide ring 1695 Imide ring 1670 Shoulder amide group |
| 15 | Xylene | 664 | White | 1776 Imide ring, 1706 Imide ring 1668 Shoulder |
| 16 | Xylene | 2290 | White | 1772 Imide ring, 1698 Imide ring 1665 Shoulder |
| 17 | Xylene | 620 | White | 3330 amino group, 1775 Imide ring 1700 Imide ring, 1664 Shoulder |
| 18 | Xylene | 171 | White | 3320 amino group, 1780 Imide ring 1705 Imide ring, 1665 Shoulder 1527 amide group |
| 19 | Xylene | 480 | — | 3310 amino group, 1780 Imide ring 1700 Imide ring, |

TABLE 5-continued

| 20 | Xylene | 805 | White | 3305 amino group, 1780 Imide ring |
| | | | | 1705 Imide ring, 1666 Shoulder |

| Preparation Examples | $^{13}$C-NMR spectrum (Intensity ratio) | | | Ratio of functional groups | |
| --- | --- | --- | --- | --- | --- |
| | W | Q | Z | (III) or (IV)/(X) or (XI) | Formamide group/ secondary amino group |
| 13 | 2.00 | not detected | not detected | 100/0 | 0/100 |
| 14 | 2.00 | 0.083 | not detected | 96/4 | 0/100 |
| 15 | 2.00 | not detected | 1.00 | 100/0 | 100/0 |
| 16 | 2.00 | not detected | 1.00 | 100/0 | 100/0 |
| 17 | 2.00 | not detected | 0.69 | 100/0 | 69/31 |
| 18 | 2.00 | 0.22 | 1.11 | 82/18 | 90/10 |
| 19 | 2.00 | not detected | not detected | 100/0 | 0/100 |
| 20 | 2.00 | not detected | 0.85 | 100/0 | 85/15 |

*PTS salt p-toluenesulfonate

Examples 1 to 34 and Comparative Examples 1 to 35

The prescribed components [A] and [B] as given in Tables 6 and 7 and component [C] comprising the formamide and/or amino group-modified product or maleic acid-modified product or unmodified product were dry blended, sufficiently dried and thoroughly kneaded with venting by the use of a NVC single screw extruder (produced by Nakatani Machine Co., Ltd.). Subsequently, test pieces were molded from the kneaded product by using an IS 100 EN injection molding machine (produced by Toshiba Machine Co., Ltd.).

TABLE 6

(Resins Selected as Component [A])

| Abbreviation | Resins | Grade | Brandnames (Manufactures) |
| --- | --- | --- | --- |
| PC-1 | Polycarbonate | A 2700 | Toughlon (Idemitsu Petrochemical Co., Ltd.) |
| PC-2 | Polycarbonate | A 2200 | Toughlon (Idemitsu Petrochemical Co., Ltd.) |
| PC-3 | Polycarbonate | A 3000 | Toughlon (Idemitsu Petrochemical Co., Ltd.) |
| PC-4 | Polycarbonate | FN 1700A | Toughlon (Idemitsu Petrochemical Co., Ltd.) |
| PAR-1 | Polyaryate | U 100 T | U polymer (Unichika Ltd.) |
| PA-1 | Polyamide-6 | 1013 | Ube Nylon (Ube Kosan Co., Ltd.) |
| PA-2 | Polyamide-6,6 | CM 3007 | Aramine (Toray Industries, Inc.) |
| PA-3 | Polyamide-6 | 1012 C* | Ube Nylon (Ube Kosan Co., Ltd.) |
| PPE-1 | Polyphenylene ether | SE 100 J | Noriru (GE Plastic Japan, Ltd.) |
| POM-1 | Polyoxymethylene | M 25 | Jurakon (Polyplastics Co., Ltd.) |
| PBT-1 | Polybutylene terephthalate | N 1000 | Toughpet (Mitsubishi Rayon Co., Ltd.) |

*Having an end rich in carboxylic acid. Caboxylic acid: amino group = 9:1

TABLE 7

(Resins Selected as Component [B])

| Abbreviation | Resins | Grade | Brandnames (Manufactures) |
| --- | --- | --- | --- |
| PE-1 | Polyethylene | 750 LB | Idemitsu Polyethylene (Idemitsu Petrochemical Co., Ltd.) |
| PE-2 | Polyethylene | 440 M | Idemitsu Polyethylene (Idemitsu Petrochemical Co., Ltd.) |
| PP-1 | Polypropylene (homopolymer) | J-400 M | Idemitsu Polypropylene (Idemitsu Petrochemical Co., Ltd,) |
| PP-2 | Polypropylene (block polymer) | J-465 H | Idemitsu Polypropylene (Idemitsu Petrochemical Co., Ltd.) |
| PP-3 | Polypropylene (block polymer) | E-150 G | Idemitsu Polypropylene (Idemitsu Petrochemical Co., Ltd.) |
| EPR-1 | Ethylene-Propylene rubber | EP 912 P | JSR EP (JSR) |
| PS-1 | High impact polystyrene | HT-52 | Idemitsu Styrol (Idemitsu Petrochemical Co., Ltd.) |
| PS-2 | GPPS | US-300 | Idemitsu Styrol (Idemitsu Petrochemical Co., Ltd.) |
| SMA-1 | Styrene-maleic acid copolymer | UG 830 | Moremax (Idemitsu Petrochemical Co., Ltd.) |
| SMA-2 | Styrene-maleic acid copolymer | UG 460 | Moremax (Idemitsu Petrochemical Co., Ltd.) |
| ABS-1 | ABS resin | 35 | JSR ABS (JSR) |
| ABS-2 | ABS resin | 45A | JSR ABS (JSR) |

By the use of the test pieces thus obtained, various physical properties of the resin composition were evaluated by the following methods.

(1) Izod impact test: according to JIS-K-7110 [Conditions] temperature=23° C. and −30° C. with a notch, n=5.

(2) Surface impact test: Automatic falling weight impact test was conducted to determine the fracture configuration and fracture energy.

[Method] An injection molded plate (80×80×3 mm) was fixed to a test piece supporting plate having 2 inches hole so that the center of the molded plate is positioned at the center of the supporting plate. A displacement curve vs. applied force was obtained under the following condition and the area until the displacement point at which the applied force suddenly decreased was obtained to determine fracture energy [J]. The fracture configuration was also observed after the end of the test to evaluate with the symbols: ductile (D)→somewhat ductile (D')→somewhat brittle (B')→brittle (B).

[Conditions] temperature=−10° C., load of weight=3.75 kg, falling velocity 32 7.0 m/sec., n=5. The testing machine was RDT 5000 (produced by Reometrics Corp.).

(3) Peeling evaluation: according to cross cut test

[Method] 100 numbers of checkers each having 1 mm square were made by notching with a sharp blade inside the square of 10×10 mm in the middle of an injection molded plate (80×80×3 mm) produced under a definite injection time and a definite filling time. Then a cellophane self-adhesive tape was pressed against the checker to stick itself and was suddenly peeled therefrom at an angle of 45 degree. Thus the residual ratio of 1 mm square checkers was defined as the following formula to evaluate the peeling. The test was performed five (5) times for each sample and the average value was taken as the average residual ratio.

5 (Residual ratio)=(number of residual 1 mm square checkers)/100

(4) Appearance: Visual evaluation was made for unfavorable appearance such as flow mark, ribbed pattern and fluff to designate with the symbols: o (good), Δ (rather bad) and×(bad).

The results obtained are given in Tables 8 to 11, in which the symbols *a to *m shall have the following meanings:

*a percentage based on the total amount of [A] and [B]

*b ratio based on 100 parts by weight of [A] and [B] in total

*c MBS elastomer (C223/Mitsubishi Rayon Co., Ltd.) was added in an amount of 10 parts by weight based on 100 parts by weight of [A] and [B] in total

*d according to Example 5

*e notched Izod impact strength (kg.cm/cm)

*f visual observation

*g cross cut (number of peeled checkers/100: the number of original checkers)

*h visual observation

*i CP-1 indicates the copolymer of Preparation Example 1, CP-2 is the copolymer of Preparation Example 2 and so forth.

*j UM-5 indicates the unmodified product prior to maleic acid grafting in Preparation Example 5, and so forth.

*k Glass fiber (03 MA 409C/Asahi Glass Fiber Co., Ltd.) was added in an amount of 10 parts by weight based on 100 parts by weight of [A] and [B] in total Twin screw extruder (TEM-35/Toshiba Machine Co., Ltd.) was used to add glass fiber. The components [A], [B] and [C] were fed at the top thereof and the glass fiber in the side for kneading together

*m 15 parts by weight of PE-1 was added based on 100 parts by weight of [A] and [B] in total

TABLE 8

| | Resin composition | | | Physical properties | | |
|---|---|---|---|---|---|---|
| | Component [A] | Component [B] | Component [C] | Impact strength*e | | |
| | (wt %)*a | (wt %)*a | (Pts. wt.)*b | 23° C. | −30° C. | color tone*f |
| Example 1 | PC-1 (90) | PE-1 (10) | Preparation Example 3 (1) | 51.5 | 20.2 | White |
| Example 2 | PC-2 (75) | PP-1 (25) | Preparation Example 1 (5) | 64.2 | 42.2 | White |
| Example 3 | PAR-1 (30) | PP-2 (70) | Preparation Example 1 (15) | 20.8 | 10.5 | Light yellow |
| Example 4 | PC-2 (75) | PS-1 (25) | Preparation Example 5 (5) | 39.6 | 17.8 | White |
| Example 5 | PC-1 (65) | SMA-2 (35) | Preparation Example 2 (10) | 100 | 60.5 | White |
| Example 6 | PC-2 (50) | ABS-1 (50) | Preparation Example 6 (3) | 64.2 | 44.4 | Light yellow |
| Comparative Example 1 | PC-1 (90) | PE-1 (10) | EPR-1 (1) | 40.7 | 12.5 | White |
| Comparative Example 2 | PC-2 (75) | PP-2 (25) | CP-1*i (5) | 8.3 | 4.4 | White |
| Comparative Example 3 | PAR-1 (30) | PP-2 (70) | — | 3.3 | 1.2 | Light yellow |
| Comparative Example 4 | PC-2 (75) | PS-1 (25) | UM-5*j (5) | 17.4 | 6.5 | White |
| Comparative Example 5 | PC-2 (75) | PS-1 (25) | CP-5 (5) | 16.7 | 6.7 | White |
| Comparative Example 6 | PC-1 (65) | SMA-2 (35) | SMA-2 (10) | 100 | 62.0 | White |
| Comparative Example 7 | PC-2 (50) | ABS-1 (50) | — | 57.3 | 32.6 | Light yellow |

TABLE 8-continued

| | | | | | | |
|---|---|---|---|---|---|---|
| Comparative Example 8 | PC-2 (50) | ABS-1 (50) | UM-6 (5) | 62.1 | 40.6 | Light yellow |

| | physical properties | | | | Kneading conditions | | |
|---|---|---|---|---|---|---|---|
| | Surface impact strength | | | | | | Number of |
| | Break surface configuration | Breaking energies (J) | Peeling*g | Appearance*h | Kneader | Temperature (°C.) | revolution (rpm) |
| Example 1 | D' | 21 | 100/100 | o | NVC | 280 | 80 |
| Example 2 | D | 28 | 100/100 | o | NVC | 260 | 80 |
| Example 3 | D' | 15 | 100/100 | o | NVC | 280 | 80 |
| Example 4 | D' | 20 | 100/100 | o | NVC | 260 | 80 |
| Example 5 | D | 34 | 100/100 | o | NVC | 260 | 80 |
| Example 6 | D | 23 | 100/100 | o | NVC | 260 | 80 |
| Comparative Example 1 | D' | 12 | 100/100 | o | NVC | 280 | 80 |
| Comparative Example 2 | B | 2 | 22/100 | x | NVC | 260 | 80 |
| Comparative Example 3 | B | 1 | 80/100 | x | NVC | 280 | 80 |
| Comparative Example 4 | B' | 3 | 73/100 | x | NVC | 260 | 80 |
| Comparative Example 5 | B' | 3 | 69/100 | x | NVC | 260 | 80 |
| Comparative Example 6 | D | 34 | 64/100 | o | NVC | 260 | 80 |
| Comparative Example 7 | D' | 16 | 35/100 | o | NVC | 260 | 80 |
| Comparative Example 8 | D' | 18 | 76/100 | o | NVC | 260 | 80 |

TABLE 9

| | Resin composition | | | Physical properties | | |
|---|---|---|---|---|---|---|
| | Component [A] | Component [B] | Component [C] | Impact strength*e | | |
| | (wt %)*a | (wt %)*a | (Pts. wt.)*b | 23° C. | −30° C. | color tone*f |
| Example 7 | PA-1 (70) | PE-1 (30) | Preparation Example 4 (5) | 64.5 | 34.1 | Light Yellow |
| Example 8 | PA-1 (70) | PE-1 (30) | Preparation Example 10 (0.1) | 32.5 | 19.4 | White |
| Example 9 | PA-2 (75) | SMA-1 (25) | Preparation Example 6 (7) | 39.9 | 28.3 | White |
| Example 10 | PA-3 (40) | ABS-1 (60) | Preparation Example 8 (3) | 50.5 | 27.4 | Light Yellow |
| Example 11 | PA-3 (40) | ABS-1 (60) | Preparation Example 5 (3) | 63.8 | 31.5 | Light Yellow |
| Example 12 | PA-1 (40) | ABS-1 (60) | Preparation Example 8 (5) | 42.3 | 14.5 | Light yellow |
| Comparative Example 9 | PA-1 (70) | PE-1 (30) | UM-4 | 8.4 | 5.0 | White |
| Comparative Example 10 | PA-2 (75) | SMA-1 (25) | — | 22.8 | 9.7 | White |
| Comparative Example 11 | PA-3 (40) | ABS-1 (60) | SMA-2 (3) | 29.5 | 6.0 | Light yellow |
| Comparative Example 12 | PA-1 (40) | ABS-1 (60) | SMA-2 (3) | 22.8 | 4.3 | Light yellow |
| Example 13 | PPE-1 (50) | ABS-2 (50) | Preparation Example 9 (5) | 42.4 | 15.6 | Light yellow |
| Comparative Example 13 | PPE-1 (50) | ABS-2 (50) | — | 14.3 | 3.2 | Light yellow |
| Comparative Example 14 | PPE-1 (50) | ABS-2 (50) | Preparation Example 9 (5) | 20.5 | 4.9 | Light yellow |
| Example 14 | POM-1 (95) | EPR-1 (5) | Preparation Example 3 (5) | 24.2 | 15.0 | Light yellow |
| Comparative Example 15 | POM-1 (95) | EPR-1 (5) | CP-3 (5) | 14.2 | 6.1 | White |
| Example 15 | PBT-1 (60) | ABS-2 (40) | Preparation Example 7 (5) | 57.6 | 22.7 | Light yellow |
| Comparative Example 16 | PBT-1 (60) | ABS-2 (40) | CP-7 | 52.0 | 12.2 | Light yellow |
| Example 16 | PBT-1 (60) | ABS-2 (40) | Preparation Example 7 (5) | 14.5 | 8.9 | Light yellow |

TABLE 9-continued

| | | | | | | | |
|---|---|---|---|---|---|---|---|
| Comparative Example 17 | PBT-1 (60) | ABS-2 (40) | UM-7 (5) | 8.3 | 7.5 | Light yellow | |

| | physical properties | | | | Kneading conditions | | |
|---|---|---|---|---|---|---|---|
| | Surface impact strength | | | | | | Number of |
| | Break surface configuration | Breaking energies (J) | Peeling*g | Appearance*h | Kneader | Temperature (°C.) | revolution (rpm) |
| Example 7 | D' | 23 | 100/100 | o | NVC | 260 | 80 |
| Example 8 | D' | 15 | 100/100 | o | NVC | 260 | 80 |
| Example 9 | D' | 21 | 100/100 | o | NVC | 260 | 80 |
| Example 10 | D | 25 | 100/100 | o | NVC | 260 | 80 |
| Example 11 | D | 23 | 100/100 | o | NVC | 260 | 80 |
| Example 12 | D' | 20 | 100/100 | o | NVC | 260 | 80 |
| Comparative Example 9 | D' | 13 | 95/100 | o | NVC | 260 | 80 |
| Comparative Example 10 | B' | 5 | 100/100 | x | NVC | 260 | 80 |
| Comparative Example 11 | B' | 6 | 17/100 | Δ | NVC | 260 | 80 |
| Comparative Example 12 | B' | 3 | 16/100 | Δ | NVC | 260 | 80 |
| Example 13 | D' | 17 | 80/100 | Δ | NVC | 260 | 80 |
| Comparative Example 13 | B | 1 | 12/100 | x | NVC | 260 | 80 |
| Comparative Example 14 | B' | 8 | 7/100 | x | NVC | 260 | 80 |
| Example 14 | B' | 10 | 100/100 | o | NVC | 280 | 80 |
| Comparative Example 15 | B | 2 | 100/100 | o | NVC | 280 | 80 |
| Example 15 | D' | 19 | 100/100 | o | NVC | 260 | 80 |
| Comparative Example 16 | D' | 13 | 80/100 | x | NVC | 260 | 80 |
| Example 16 | — | 24 | — | Δ | TEM*¹ | 280 | 300 |
| Comparative Example 17 | — | 17 | — | Δ | TEM*¹ | 280 | 300 |

TABLE 10

| | Resin composition | | | Physical properties | | |
|---|---|---|---|---|---|---|
| | Component [A] | Component [B] | Component [C] | Impact strength*c | | |
| | (wt %)*a | (wt %)*a | (Pts. wt.)*b | 23° C. | −30° C. | color tone*f |
| Example 17 | PC-4 (15) | PE-1 (85) | Preparation Example 16 (5) | 37.3 | 24.6 | White |
| Example 18 | PC-3 (70) | PE-2 (30) | Preparation Example 14 (3) | 42.6 | 23.5 | Light yellow |
| Example 19*m | PC-4 (20) | PP-3 (80) | Preparation Example 15 (0.5) | 40.8 | 24.1 | White |
| Example 20 | PC-2 (50) | PP-1 (50) | Preparation Example 11 (5) | 37.3 | 18.9 | White |
| Example 21 | PC-2 (50) | PP-1 (50) | Preparation Example 21 (5) | 29.6 | 15.4 | Light yellow |
| Example 22 | PC-2 (95) | EPR-1 (5) | Preparation Example 19 (2) | 70.8 | 39.9 | White |
| Example 23 | PC-2 (70) | PS-2 (30) | Preparation Example 17 (5) | 22.7 | 10.5 | White |
| Example 24*c | PC-2 (65) | SMA-1 (35) | Preparation Example 18 (10) | 96.0 | 56.4 | White |
| Comparative Example 18 | PC-4 (15) | PE-1 (85) | UM-16 (5) | 17.6 | 3.2 | White |
| Comparative Example 19 | PC-3 (70) | PE-2 (30) | — | 4.3 | 2.6 | White |
| Comparative Example 20 | PC-4 (20) | PP-3 (80) | UM-15 (1) | 32.4 | 12.2 | White |
| Comparative Example 21 | PC-4 (20) | PP-3 (80) | Preparation Example 15 (0.04) | 34.9 | 13.4 | White |
| Comparative Example 22 | PC-2 (50) | PP-1 (50) | — | 7.2 | 4.6 | White |
| Comparative Example 23 | PC-2 (95) | EPR-1 (5) | UM-19 (2) | 52.0 | 14.9 | White |
| Comparative Example 24 | PC-2 (70) | PS-2 (30) | UM-17 (5) | 9.5 | 3.6 | White |

TABLE 10-continued

|  | Component [A] | Component [B] | Component [C] | | | |
|---|---|---|---|---|---|---|
| Comparative Example 25 | PC-2 (65) | SMA-1 (35) | SMA-1 (10) | 98.8 | 50.9 | White |
| Example 25 | PA-1 (70) | PP-1 (30) | Preparation Example 17 (7) | 63.3 | 35.1 | White |
| Example 26 | PA-2 (80) | SMA-1 (20) | Preparation Example 12 (5) | 38.6 | 21.8 | White |
| Example 27 | PA-2 (80) | SMA-1 (20) | Preparation Example 22 (5) | 33.2 | 18.6 | Light yellow |
| Example 28 | PA-3 (50) | ABS-2 (50) | Preparation Example 15 (3) | 59.1 | 32.4 | Light yellow |
| Example 29 | PA-1 (50) | ABS-2 (50) | Preparation Example 15 (3) | 53.8 | 30.6 | Light yellow |

|  | physical properties | | | | Kneading conditions | | |
|---|---|---|---|---|---|---|---|
|  | Surface impact strength | | | | | | Number of |
|  | Break surface configuration | Breaking energies (J) | Peeling*g | Appearance*h | Kneader | Temperature (°C.) | revolution (rpm) |
| Example 17 | D' | 20 | 100/100 | o | NVC | 260 | 80 |
| Example 18 | D | 25 | 100/100 | o | NVC | 260 | 80 |
| Example 19 | D | 24 | 100/100 | o | NVC | 260 | 80 |
| Example 20 | D' | 18 | 100/100 | o | NVC | 260 | 80 |
| Example 21 | D' | 15 | 100/100 | o | NVC | 260 | 80 |
| Example 22 | D | 30 | 100/100 | o | NVC | 280 | 80 |
| Example 23 | D' | 15 | 100/100 | o | NVC | 260 | 80 |
| Example 24 | D | 32 | 100/100 | o | NVC | 260 | 80 |
| Comparative Example 18 | B' | 4 | 60/100 | o | NVC | 260 | 80 |
| Comparative Example 19 | B | 2 | 7/100 | x | NVC | 260 | 80 |
| Comparative Example 20 | B' | 4 | 26/100 | Δ | NVC | 260 | 80 |
| Comparative Example 21 | B' | 5 | 36/100 | Δ | NVC | 260 | 80 |
| Comparative Example 22 | B | 1 | 1/100 | x | NVC | 260 | 80 |
| Comparative Example 23 | D' | 14 | 100/100 | o | NVC | 280 | 80 |
| Comparative Example 24 | B | 3 | 80/100 | Δ | NVC | 260 | 80 |
| Comparative Example 25 | D | 33 | 77/100 | o | NVC | 260 | 80 |
| Example 25 | D | 30 | 100/100 | o | NVC | 260 | 80 |
| Example 26 | D | 24 | 100/100 | o | NVC | 260 | 80 |
| Example 27 | D' | 21 | 100/100 | o | NVC | 260 | 80 |
| Example 28 | D | 25 | 100/100 | o | NVC | 260 | 80 |
| Example 29 | D' | 18 | 100/100 | o | NVC | 260 | 80 |

TABLE 11

|  | Resin composition | | | Physical properties | | |
|---|---|---|---|---|---|---|
|  | Component [A] | Component [B] | Component [C] | Impact strength*c | | |
|  | (wt %)*a | (wt %)*a | (Pts. wt.)*b | 23° C. | −30° C. | color tone*f |
| Comparative Example 26 | PA-1 (70) | PP-1 (30) | CP-17 (7) | 7.4 | 2.5 | White |
| Comparative Example 27 | PA-1 (70) | PP-1 (30) | UM-17 (7) | 8.7 | 3.1 | White |
| Comparative Example 28 | PA-2 (80) | SMA-1 (20) | SMA-1 (5) | 21.5 | 9.0 | White |
| Comparative Example 29 | PA-3 (50) | ABS-2 (50) | — | 24.5 | 7.3 | Light Yellow |
| Comparative Example 30 | PA-1 (50) | ABS-2 (50) | CP-15 (3) | 28.2 | 12.5 | Light Yellow |
| Example 30 | PPE-1 (60) | ABS-2 (40) | Preparation Example 16 (5) | 40.3 | 18.2 | Light yellow |
| Comparative Example 31 | PPE-1 (60) | ABS-2 (40) | UM-16 (5) | 22.2 | 5.2 | Light yellow |
| Example 31 | POM-1 (95) | EPR-1 (5) | Preparation Example 20 (8) | 25.9 | 17.7 | White |
| Comparative Example 32 | POM-1 (95) | EPR-1 (5) | UM-20 (8) | 12.7 | 5.8 | White |
| Example 32 | PAR-1 (30) | ABS-2 (70) | Preparation | 23.9 | 8.9 | Light yellow |

TABLE 11-continued

| | | | Example 12 (3) | | | | |
|---|---|---|---|---|---|---|---|
| Comparative Example 33 | PAR-1 (30) | ABS-2 (70) | — | | 5.3 | 2.2 | Light yellow |
| Example 33 | PBT-1 (30) | ABS-2 (70) | Preparation Example 20 (5) | | 58.9 | 21.4 | Light yellow |
| Comparative Example 34 | PBT-1 (30) | ABS-2 (70) | CP-20 (5) | | 57.5 | 11.9 | Light yellow |
| Example 34 | PBT-1 (60) | ABS-2 (40) | Preparation Example 13 (5) | | 13.6 | 8.0 | Light yellow |
| Comparative Example 35 | PBT-1 (60) | ABS-2 (40) | EPR-1 (5) | | 8.9 | 4.5 | Light yellow |

| | physical properties | | | | Kneading conditions | | |
|---|---|---|---|---|---|---|---|
| | Surface impact strength | | | | | | Number of |
| | Break surface configuration | Breaking energies (J) | Peeling*g | Appearance*h | Kneader | Temperature (°C.) | revolution (rpm) |
| Comparative Example 26 | B | 2 | 18/100 | x | NVC | 260 | 80 |
| Comparative Example 27 | B | 2 | 4/100 | x | NVC | 260 | 80 |
| Comparative Example 28 | B' | 5 | 100/100 | x | NVC | 260 | 80 |
| Comparative Example 29 | B | 5 | 3/100 | Δ | NVC | 260 | 80 |
| Comparative Example 30 | B' | 2 | 5/100 | Δ | NVC | 260 | 80 |
| Example 30 | D | 22 | 100/100 | Δ | NVC | 260 | 80 |
| Comparative Example 31 | B' | 7 | 16/100 | x | NVC | 260 | 80 |
| Example 31 | B' | 9 | 100/100 | o | NVC | 280 | 80 |
| Comparative Example 32 | B | 2 | 100/100 | o | NVC | 280 | 80 |
| Example 32 | B' | 7 | 100/100 | o | NVC | 280 | 80 |
| Comparative Example 33 | B | 2 | 77/100 | Δ | NVC | 280 | |
| Example 33 | D | 22 | 100/100 | o | NVC | 260 | 80 |
| Comparative Example 34 | D' | 13 | 85/100 | Δ | NVC | 260 | 300 |
| Example 34 | — | 22 | — | Δ | TEM | 280 | 300 |
| Comparative Example 35 | — | 18 | — | Δ | TEM | 280 | 300 |

What is claimed is:

1. A thermoplastic resin composition which comprises as principal components 5 to 95% by weight of a [A] thermoplastic resin having a functional group reactive with an amino group, 95 to 5% by weight of [B] at least one polymer selected from an olefinic polymer and a styrenic polymer, the subtotal of the above [A]+[B] being 100 parts by weight, and 0.05 to 20 parts by weight of a [C] copolymer or a salt thereof, said copolymer having in a molecule thereof at least one group selected from a formamide group and an amino group, said copolymer having 20 to 99.8 mol % of the repeating unit I represented by the general formula (I); 50 to 0 mol % of the repeating unit II represented by the general formula (II); and 60 to 0.2 mol % of the repeating unit III represented by the general formula (III) or the repeating unit IV represented by the general formula (IV)

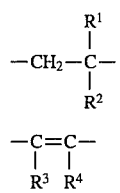
(I)

$$-C=C- \atop R^3 \ R^4$$
(II)

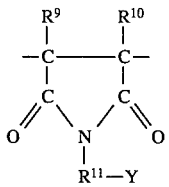
(III)

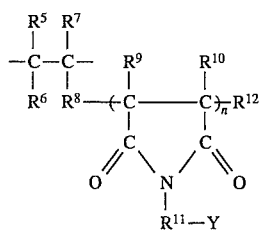
(IV)

wherein $R^1$, $R^2$, $R^5$, $R^6$ and $R^7$, independently of one another, are each a hydrogen atom, an alkyl group having 1 to 10 carbon atoms, a cycloalkyl group having 3 to 8 carbon atoms, an aryl group having 6 to 10 carbon atoms, an alkenyl group having 2 to 4 carbon atoms, an alkoxy group having 1 to 4 carbon atoms, an alkoxycarbonyl group having 1 to 18 carbon atoms, an alkylcarboxyl group having 1 to 17 carbon atoms, an alkylcarbonyl group having 1 to 6 carbon atoms, an arylcarbonyl group having 6 to 8 carbon atoms, a halogen atom or a nitrile group; $R^3$ and $R^4$, independently of one another, are each a hydrogen atom, an alkyl group having 1 to 4 carbon atoms, an alkenyl group having 2 to 4 carbon atoms or a halogen atom; $R^8$ is absent or denotes a methylene group or an ethylene group; $R^9$ and $R^{10}$, independently of one another, are each a hydrogen atom, an alkyl group having 1 to 6 carbon atoms or an aryl group having 6 to 8 carbon atoms; $R^{11}$ is an alkylene group having 1 to 12 carbon atoms, a cycloalkylene group having 5 to 17 carbon atoms, an arylene group having 6 to 12 carbon atoms, an arylalkylene group having 7 to 12 carbon atoms or a polyoxyalkylene group having 4 to 30 carbon atoms; $R^{12}$ is a hydrogen group or an alkyl group having 1 to 10 carbon atoms; Y is at least one kind of amino group selected from the group consisting of the general formulae (V) to (VIII),

 (V)

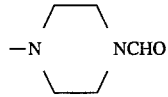 (VI)

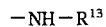 (VII)

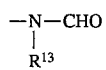 (VIII)

where $R^{13}$ in the general formula (VII) and (VIII) is an alkyl group having 1 to 6 carbon atoms; $R^1$ to $R^{13}$ may be the same or different among the repeating units; and n is an integer from 1 to 10.

2. The composition according to claim 1 wherein the [A] thermoplastic resin having a functional group reactive with an amino group has at least one bond selected from carbonate bond, ester bond, amide bond and ether bond.

* * * * *